(12) United States Patent
Shionozaki et al.

(10) Patent No.: US 10,788,235 B2
(45) Date of Patent: Sep. 29, 2020

(54) CONTROL SYSTEM, CONTROL METHOD, AND STORAGE MEDIUM

(71) Applicant: SONY CORPORATION, Tokyo (JP)

(72) Inventors: Atsushi Shionozaki, Tokyo (JP); Satoshi Ikeda, Kanagawa (JP); Tetsuo Tawara, Kanagawa (JP); Yasushi Miyajima, Tokyo (JP)

(73) Assignee: SONY CORPORATION, Tokyo (JP)

( * ) Notice: Subject to any disclaimer, the term of this patent is extended or adjusted under 35 U.S.C. 154(b) by 266 days.

(21) Appl. No.: 15/515,653

(22) PCT Filed: Aug. 4, 2015

(86) PCT No.: PCT/JP2015/072033
§ 371 (c)(1),
(2) Date: Mar. 30, 2017

(87) PCT Pub. No.: WO2016/072116
PCT Pub. Date: May 12, 2016

(65) Prior Publication Data
US 2017/0297201 A1    Oct. 19, 2017

(30) Foreign Application Priority Data

Nov. 7, 2014    (JP) ................................. 2014-227005

(51) Int. Cl.
*G05B 15/00* (2006.01)
*G05B 19/00* (2006.01)
(Continued)

(52) U.S. Cl.
CPC ............. *F24F 11/89* (2018.01); *B25J 9/1694* (2013.01); *G05D 1/0094* (2013.01); *B64C 2201/12* (2013.01)

(58) Field of Classification Search
CPC ....... F24F 11/89; G05D 1/0094; B25J 9/1694; B64C 1/00
See application file for complete search history.

(56) References Cited

U.S. PATENT DOCUMENTS

| | | | |
|---|---|---|---|
| 6,175,772 B1 * | 1/2001 | Kamiya | G06N 3/008 700/31 |
| 6,269,763 B1 * | 8/2001 | Woodland | A62C 29/00 114/144 A |

(Continued)

FOREIGN PATENT DOCUMENTS

| | | |
|---|---|---|
| JP | 10-289006 A | 10/1998 |
| JP | 11-259129 A | 9/1999 |

(Continued)

OTHER PUBLICATIONS

International Search Report dated Oct. 6, 2015 in PCT/JP2015/072033 filed Aug. 4, 2015.

(Continued)

*Primary Examiner* — Khoi H Tran
*Assistant Examiner* — Jorge O Peche
(74) *Attorney, Agent, or Firm* — Oblon, McClelland, Maier & Neustadt, L.L.P.

(57) ABSTRACT

[Object] To provide a control system, a control method, and a storage medium through which a moving object can change a surrounding environment of a user depending on an emotion of the user.
[Solution] Provided is a control system including: an estimation unit that estimates an emotion of a user; and a moving object controller that controls a moving object to change a surrounding environment of the user depending on the estimated emotion.

20 Claims, 25 Drawing Sheets

(51) Int. Cl.
  *F24F 11/89* (2018.01)
  *G05D 1/00* (2006.01)
  *B25J 9/16* (2006.01)

(56) References Cited

U.S. PATENT DOCUMENTS

| | | | | |
|---|---|---|---|---|
| 8,996,429 | B1* | 3/2015 | Francis, Jr. | G06N 3/008 |
| | | | | 706/12 |
| 9,471,059 | B1* | 10/2016 | Wilkins | G05D 1/0016 |
| 9,643,722 | B1* | 5/2017 | Myslinski | G05D 1/0094 |
| 9,888,361 | B2* | 2/2018 | Freeman | H04W 4/023 |
| 10,408,631 | B2* | 9/2019 | Delaney | G01C 21/3484 |
| 10,454,863 | B2* | 10/2019 | Ryu | G06Q 30/0251 |
| 10,655,968 | B2* | 5/2020 | Rezvani | G05D 1/0055 |
| 2001/0001318 | A1* | 5/2001 | Kamiya | F24F 11/62 |
| | | | | 700/246 |
| 2001/0043000 | A1* | 11/2001 | Hinds | A47C 15/004 |
| | | | | 297/130 |
| 2005/0124234 | A1* | 6/2005 | Sells | B63H 21/24 |
| | | | | 440/33 |
| 2006/0124122 | A1* | 6/2006 | Young | F24S 50/20 |
| | | | | 126/573 |
| 2007/0192910 | A1* | 8/2007 | Vu | G05D 1/021 |
| | | | | 700/245 |
| 2008/0221730 | A1* | 9/2008 | Sakata | G06N 3/004 |
| | | | | 700/245 |
| 2009/0119083 | A1* | 5/2009 | Avey | G16B 45/00 |
| | | | | 703/11 |
| 2010/0298976 | A1* | 11/2010 | Sugihara | A63H 11/20 |
| | | | | 700/248 |
| 2014/0081090 | A1* | 3/2014 | Picard | G06F 19/3481 |
| | | | | 600/301 |
| 2014/0111332 | A1* | 4/2014 | Przybylko | G08B 21/0269 |
| | | | | 340/539.1 |
| 2014/0262578 | A1* | 9/2014 | Calley | B62K 5/027 |
| | | | | 180/210 |
| 2015/0314454 | A1* | 11/2015 | Breazeal | B25J 9/0003 |
| | | | | 700/259 |
| 2015/0350614 | A1* | 12/2015 | Meier | G06K 9/0063 |
| | | | | 348/144 |
| 2015/0350730 | A1* | 12/2015 | el Kaliouby | A61B 5/165 |
| | | | | 725/12 |
| 2016/0078757 | A1* | 3/2016 | Inaba | G08G 1/16 |
| | | | | 701/119 |
| 2016/0179075 | A1* | 6/2016 | Shin | H04W 4/70 |
| | | | | 700/275 |
| 2016/0351089 | A1* | 12/2016 | Salem | G09F 21/12 |
| 2016/0360087 | A1* | 12/2016 | Kwon | H04N 5/23216 |
| 2016/0364657 | A1* | 12/2016 | Bryant | G06Q 50/30 |
| 2016/0364824 | A1* | 12/2016 | Bryant | G06Q 10/063114 |
| 2017/0068847 | A1* | 3/2017 | el Kaliouby | H04N 21/251 |
| 2017/0205827 | A1* | 7/2017 | Rezvani | G05D 1/02 |
| 2017/0235308 | A1* | 8/2017 | Gordon | B64C 39/024 |
| | | | | 701/2 |
| 2017/0240280 | A1* | 8/2017 | Karabed | B64C 39/024 |
| 2017/0244937 | A1* | 8/2017 | Meier | B64C 39/024 |
| 2017/0330160 | A1* | 11/2017 | Sueyoshi | G06F 21/6263 |
| 2017/0358201 | A1* | 12/2017 | Govers | G05D 1/0248 |
| 2017/0370744 | A1* | 12/2017 | Miyajima | G01C 21/26 |
| 2018/0025144 | A1* | 1/2018 | Shionozaki | G06F 21/316 |
| | | | | 726/19 |
| 2018/0027987 | A1* | 2/2018 | Calhoun | A47C 31/007 |
| 2018/0088770 | A1* | 3/2018 | Brombach | G06F 3/044 |
| 2018/0107210 | A1* | 4/2018 | Harnett | B64D 1/02 |
| 2018/0126914 | A1* | 5/2018 | Ferreri | B60R 7/12 |
| 2018/0136615 | A1* | 5/2018 | Kim | G06N 20/10 |
| 2018/0160263 | A1* | 6/2018 | Austraat | H04L 67/10 |
| 2018/0160278 | A1* | 6/2018 | Patel | H04W 4/08 |
| 2018/0190257 | A1* | 7/2018 | Gharabegian | G10K 11/178 |
| 2018/0195868 | A1* | 7/2018 | Rezvani | B64C 39/024 |
| 2018/0203470 | A1* | 7/2018 | Pattison | G05D 1/0016 |
| 2018/0213208 | A1* | 7/2018 | Guo | H04N 13/296 |
| 2018/0291579 | A1* | 10/2018 | Gharabegian | B64C 39/024 |
| 2018/0305015 | A1* | 10/2018 | Myslinski | G06K 9/00711 |
| 2018/0305016 | A1* | 10/2018 | Myslinski | G05D 1/0088 |
| 2018/0305017 | A1* | 10/2018 | Myslinski | G06F 40/205 |
| 2018/0336575 | A1* | 11/2018 | Hwang | G06Q 30/0201 |
| 2019/0042854 | A1* | 2/2019 | Sanjay | G06K 9/00335 |
| 2019/0092465 | A1* | 3/2019 | Myslinski | G06K 9/6202 |
| 2019/0143528 | A1* | 5/2019 | Hayashi | A63H 3/40 |
| | | | | 700/245 |
| 2019/0202061 | A1* | 7/2019 | Shukla | G06K 9/00369 |
| 2019/0225336 | A1* | 7/2019 | Myslinski | G06F 40/205 |
| 2019/0232974 | A1* | 8/2019 | Reiley | B60W 60/0013 |
| 2019/0272846 | A1* | 9/2019 | Zhang | G06K 9/00281 |
| 2019/0281259 | A1* | 9/2019 | Palazzolo | H04N 7/183 |
| 2019/0295207 | A1* | 9/2019 | Day | G06Q 90/205 |
| 2019/0351912 | A1* | 11/2019 | Woo | A61B 5/6893 |
| 2019/0380020 | A1* | 12/2019 | Pellegrini | H04W 4/021 |
| 2019/0385264 | A1* | 12/2019 | Kotake | G10L 25/03 |
| 2019/0391098 | A1* | 12/2019 | Park | G01N 27/045 |
| 2020/0001894 | A1* | 1/2020 | Kaneko | B60W 50/14 |
| 2020/0034746 | A1* | 1/2020 | Poitras | G06F 9/46 |
| 2020/0090393 | A1* | 3/2020 | Shin | G10L 21/007 |
| 2020/0094964 | A1* | 3/2020 | Myslinski | G06Q 30/0201 |
| 2020/0132481 | A1* | 4/2020 | Majima | G01C 21/3423 |
| 2020/0134765 | A1* | 4/2020 | Majima | G06Q 10/02 |

FOREIGN PATENT DOCUMENTS

| | | |
|---|---|---|
| JP | 2004-66367 A | 3/2004 |
| JP | 2008-246665 A | 10/2008 |
| JP | 2008-278981 A | 11/2008 |
| JP | 2009-208727 A | 9/2009 |
| JP | 2012-59107 A | 3/2012 |
| JP | 2013-246517 A | 12/2013 |
| WO | WO 2013/020562 A1 | 2/2013 |
| WO | WO 2014/157359 A1 | 10/2014 |
| WO | WO 2018122830 * | 7/2018 |

OTHER PUBLICATIONS

Combined Chinese Office Action and Search Report dated Nov. 29, 2019, in Patent Application No. 201580059112.7, 16 pages (with English translation).

* cited by examiner

FIG. 2
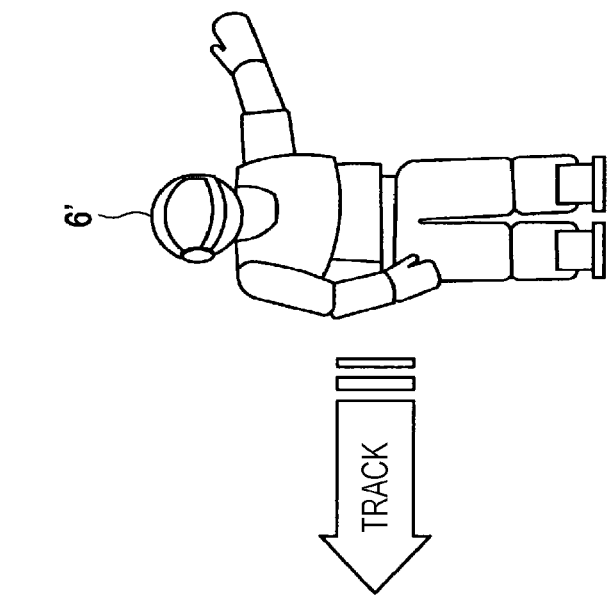
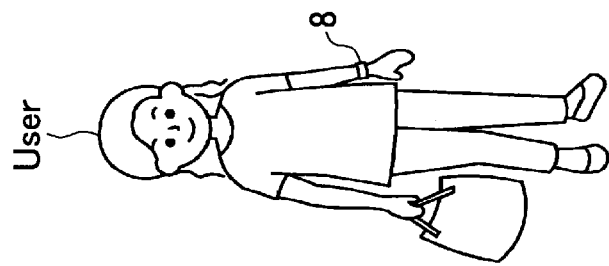
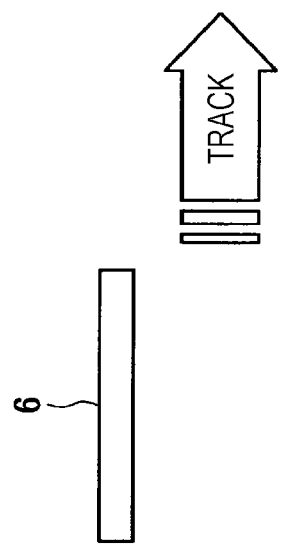

FIG.9
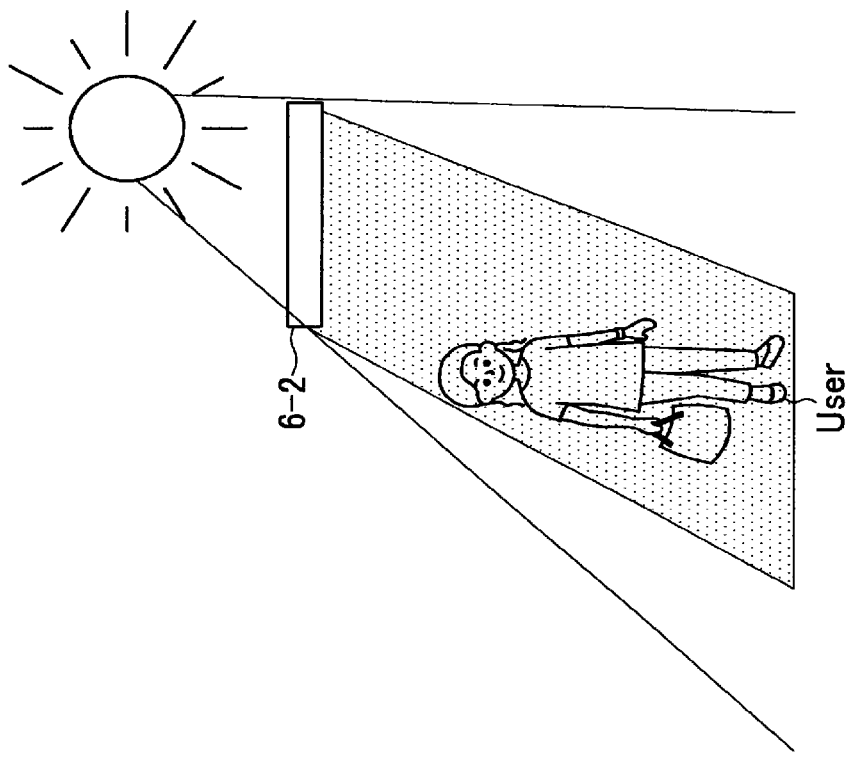
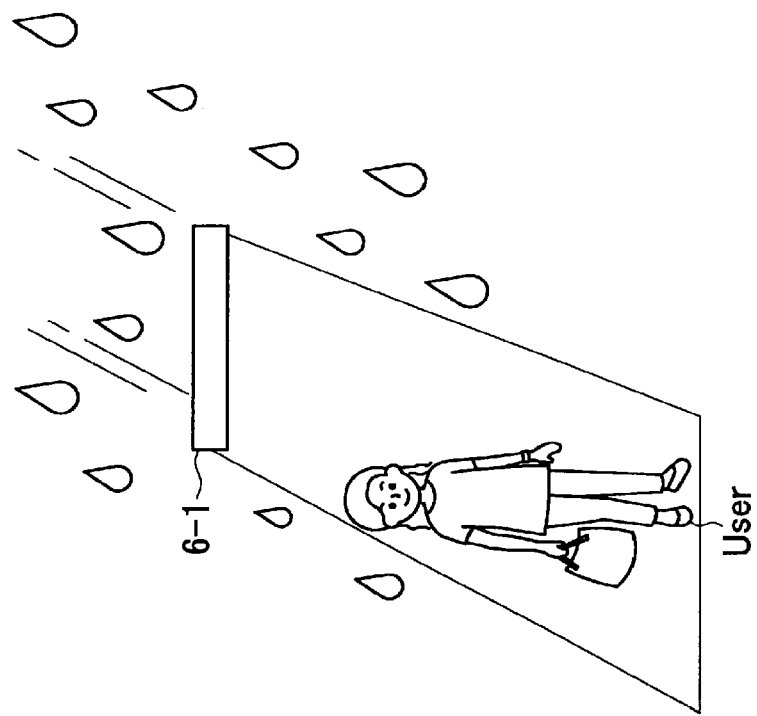

FIG.10
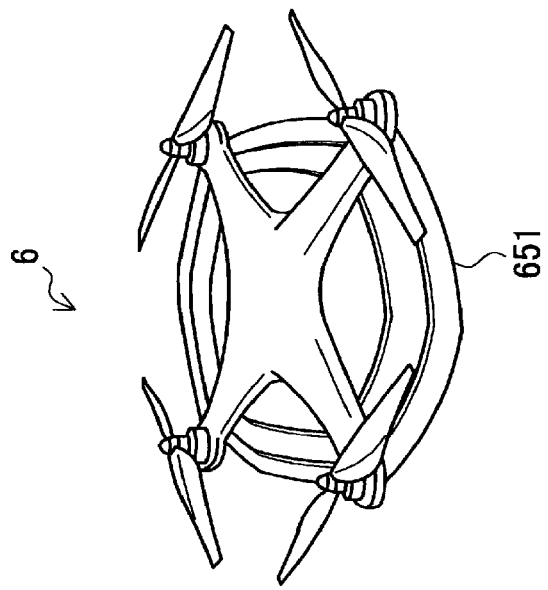
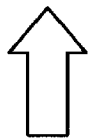
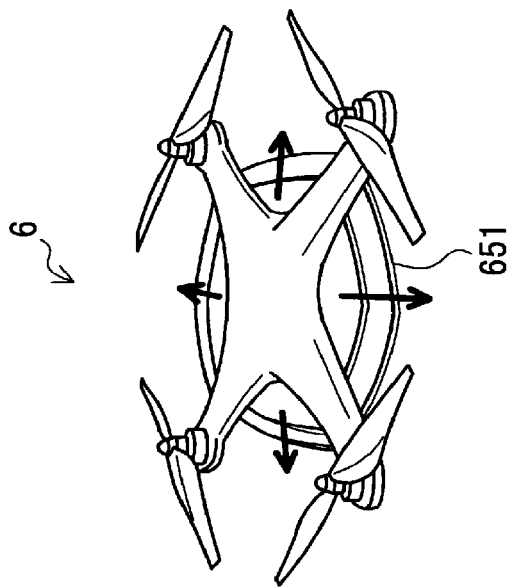

CONTROL SYSTEM, CONTROL METHOD, AND STORAGE MEDIUM

TECHNICAL FIELD

The present disclosure relates to a control system, a control method, and a storage medium.

BACKGROUND ART

Recently, a technology for automatically controlling robots to improve the lives of users to comfortable life has been proposed.

For example, Patent Literature 1 below discloses a robot that evaluates an emotional state of a person from an expression of the person and delivers information to family members who do not live with the person. Patent Literature 2 below discloses a technology for estimating a user's emotion from a captured image and bio-information and varying a behavior of a robot or changing a subject depending on the emotion estimation result. Patent Literature 3 below discloses a communication robot that judges the disposition of a user from the strength of the user's touch of the robot and the like and determines an emotion from a touch duration time.

In addition, Patent Literatures 4 and 5 below propose devices that adjust the angle of a parasol by a motor depending on a position of the sun.

CITATION LIST

Patent Literature

Patent Literature 1: JP 2013-246517A
Patent Literature 2: JP 2012-59107A
Patent Literature 3: JP 2008-278981A
Patent Literature 4: WO 2013-020562
Patent Literature 5: US 2006-0124122

SUMMARY OF INVENTION

Technical Problem

However, the Patent Literatures described above do not consider a technology for tracking a moving user and changing the user's surrounding environment. The technologies described in Patent Literatures 4 and 5 control a fixed device such as a beach parasol on the assumption that a person remains in the same place and cannot change a surrounding environment of a moving person.

For example, if it suddenly starts raining while a user is out, the user has the feeling to take shelter from the rain (or the feeling of being uncomfortable getting wet from the rain). The user's life may be improved by controlling a moving object depending on the user's feeling to locally change a surrounding environment of the user such that the user does not get wet from the rain.

Accordingly, the present disclosure proposes a control system, a control method, and a storage medium through which a moving object can change a surrounding environment of a user depending on an emotion of the user.

Solution to Problem

According to the present disclosure, there is provided a control method comprising: estimating an emotion of a user; and controlling a moving object to change a surrounding environment of the user depending on the estimated emotion.

According to the present disclosure, there is provided a control system including: an estimation unit that estimates an emotion of a user; and a moving object controller that controls a moving object to change a surrounding environment of the user depending on the estimated emotion.

According to the present disclosure, there is provided a storage medium having a program stored therein, the program causing a computer to function as: an estimation unit that estimates an emotion of a user; and a moving object controller that controls a moving object to change a surrounding environment of the user depending on the estimated emotion.

Advantageous Effects of Invention

According to the present disclosure described above, it is possible for a moving object to change a surrounding environment of a user depending on an emotion of the user.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 2 is an illustration of an example of a moving object tracking a user.

FIG. 9 is an explanatory diagram of an overview of covering from rain and sunlight by the moving object of the present embodiment.

FIG. 10 is an explanatory diagram of extension of a cover range by the moving object of the present embodiment.

MODE(S) FOR CARRYING OUT THE INVENTION

Figure 1:
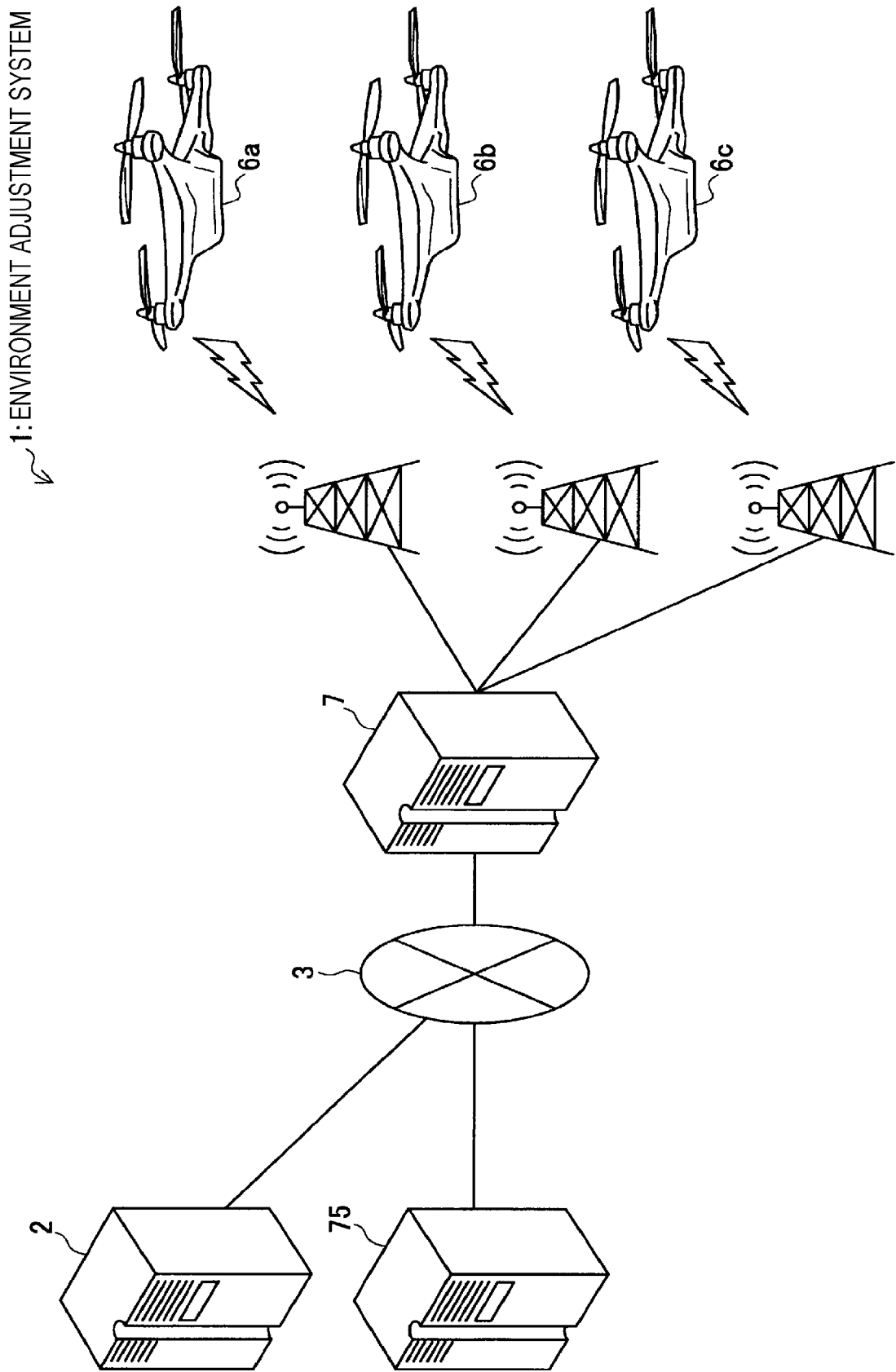
FIG. 1 is an explanatory diagram of an overview of an environment adjustment system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

In addition, a description will be given in the following order.
1. Overview of environment adjustment system according to embodiment of present disclosure
2. Basic configurations and operations
2-1. Configuration of moving object
2-2. Configuration of environment adjustment server
2-3. Configuration of emotion server
2-4. Environment adjustment operation
3. Examples of environmental change
3-1. Covering from rain and sunlight
3-2. Lighting
3-3. Output of wind, water and the like
3-4. Music playback
4. Conclusion <<1. Overview of Environment Adjustment System According to embodiment of Present Disclosure>>

First of all, an overview of an environment adjustment system 1 according to an embodiment of the present disclosure will be described with reference to FIG. 1. As illustrated in FIG. 1, the environment adjustment system 1 according to the present embodiment includes a moving object 6 that tracks a user to change a surrounding environment of the user and an environment adjustment server 7 that controls the moving object 6. The environment adjustment server 7 communicates with the moving object 6 via an access point or the like and performs movement control and the like of the moving object 6. The moving object 6 may be a plurality of moving objects 6a to 6c and may move using base stations installed outdoors or the like as base points, as illustrated in FIG. 1.

In addition, the environment adjustment server 7 is connected to an emotion server 2 and a heat map server 75 via a network 3 and acquires information necessary for movement control of the moving object 6. The environment adjustment server 7 may provide a pleasant environment for a user by causing the moving object 6 to track the user and locally change a surrounding environment depending on an emotion of the user.

The moving object 6 may be a small drone as illustrated in FIG. 1 and can fly while tracking a moving user as illustrated in FIG. 2. Furthermore, the moving object 6 is not limited to the flying object illustrated in FIG. 1 and may be, for example, a robot type moving object 6' that moves on the ground while tracking a user, as illustrated in FIG. 2, or a moving object in the water (not shown). The forms of the moving objects 6 and 6' illustrated in FIGS. 1 and 2 are examples and the present embodiment is not limited thereto.

In addition, a user may wear a band type communication terminal (referred to hereinafter as a smart band) 8 for acquiring bio-information such as the pulse and temperature, as illustrated in FIG. 2. The smart band 8 transmits acquired bio-information to the moving object 6. The bio-information acquired from the user may be used as information for estimating a user's emotion.

The overview of the environment adjustment system 1 according to the present disclosure has been described. Next, specific configurations and basic operations of devices included in the environment adjustment system 1 will be described with reference to FIGS. 3 to 8.

<<2. Basic Configurations and Operations>>

<2-1. Configuration of Moving Object>

Figure 3:
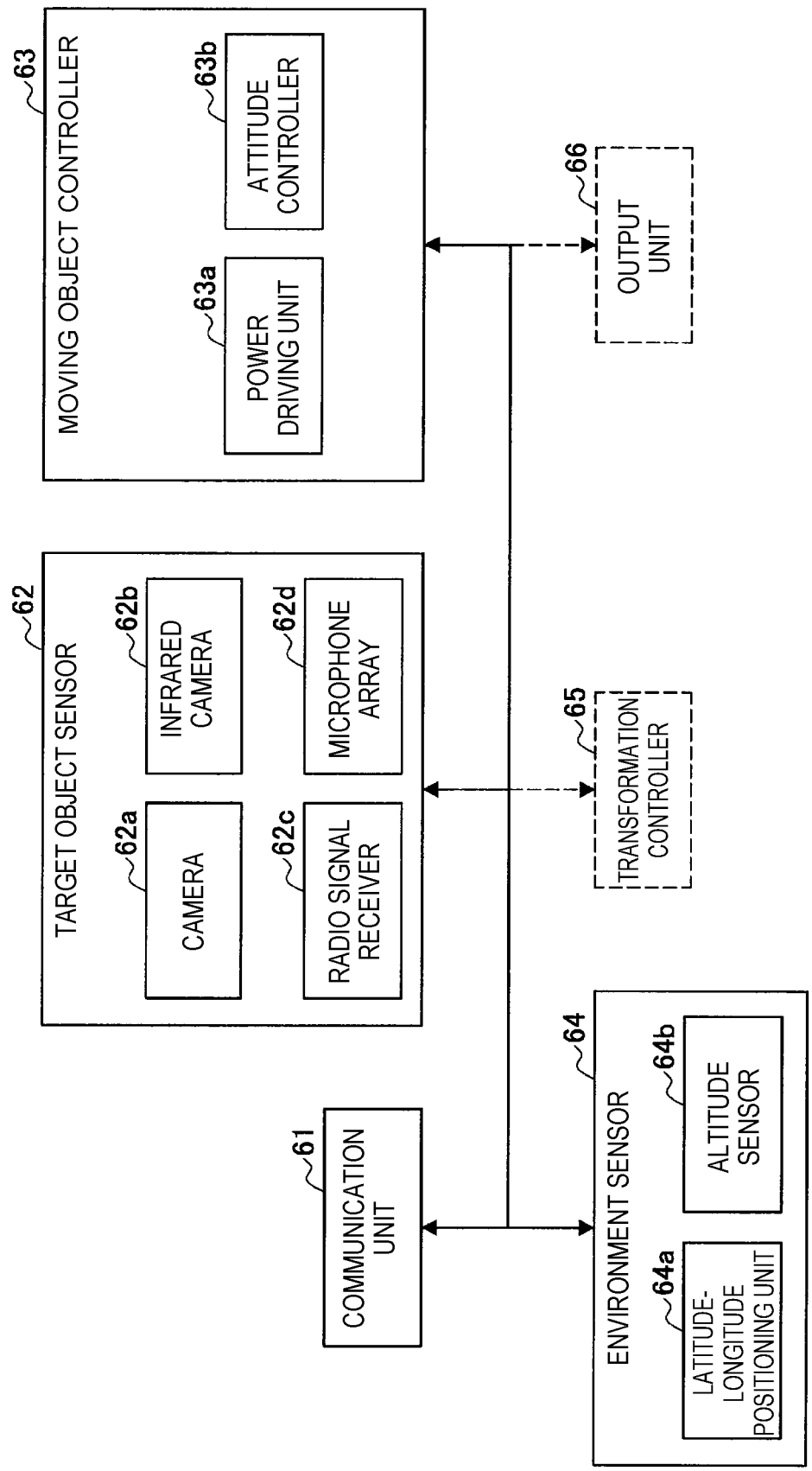
FIG. 3 is a block diagram illustrating an example of a configuration of a moving object according to the present embodiment.

FIG. 3 is a block diagram illustrating an example of a configuration of the moving object 6 according to the present embodiment. As illustrated in FIG. 3, the moving object 6 includes a communication unit 61, a target object sensor 62, a moving object controller 63 and an environment sensor 64. The configuration illustrated in FIG. 3 is an example and the moving object 6 may further include a transformation controller 65 and an output unit 66, for example.

The communication unit 61 transmits/receives data to/from the environment adjustment server 7. For example, the communication unit 61 transmits sensor information acquired through the target object sensor 62 and the environment sensor 64 to the environment adjustment server 7 and receives control information including instructions of movement control and transformation control from the environment adjustment server 7.

The target object sensor 62 is a sensing unit that acquires information about a tracking target object. Here, the tracking target object corresponds to a user moving outdoors, for example. Specifically, the target object sensor 62 acquires information about a user through a camera 62a, an infrared camera 62b, a radio signal receiver 62c or a microphone array 62d, for example.

The camera 62a is a general photographing device using visible light and photographs the tracking target object to acquire a captured image. In addition, the infrared camera

62*b* is an example of a photographing device using nonvisible light and photographs the tracking target object to acquire an infrared image. The radio signal receiver 62*c* receives, for example, bio-information of the user, transmitted from the smart band 8 worn by the user. Furthermore, the radio signal receiver 62*c* also detects a beacon and the like for specifying the position of the user. The microphone array 62*d* acquires surrounding sounds such as the sound of footsteps of the user.

The specific example of the target object sensor 62 described above is an example and the target object sensor 62 may further include an ultrasonic sensor, a distance measurement sensor and the like.

The moving object controller 63 has a function of controlling movement of the moving object 6. Specifically, the moving object controller 63 includes a power-driving unit 63*a* and an attitude controller 63*b*, as illustrated in FIG. 3. The power-driving unit 63*a* is realized by, for example, a propeller, a wheel or walking legs and operates to track a target user in accordance with control of the moving object controller 63. In addition, the attitude controller 63*b* senses an attitude of the moving object 6 through a gyro sensor or the like and controls the power-driving unit 63*a* to adjust an inclination and altitude of the moving object 6. The moving object controller 63 according to the present disclosure may locally change a surrounding environment of a user by controlling a flight path and altitude of the moving object 6 such that the moving object 6 becomes, for example, a cover from rain or sunlight for the user.

The environment sensor 64 is a sensing unit that acquires information about a surrounding environment. Specifically, the environment sensor 64 acquires environment information through a latitude-longitude positioning unit 64*a* or an altitude sensor 64*b*, for example. The specific example of the environment sensor 64 is not limited to the example illustrated in FIG. 3 and the environment sensor 64 may further include a temperature sensor, a humidity sensor and the like as necessary.

The transformation controller 65 performs control of transforming the shape of the moving object 6 to extend a cover range when covering from rain or sunlight. Extension of the cover range by the moving object 6 will be described below with reference to FIGS. 10 and 11.

The output unit 66 provides various outputs for changing a surrounding environment of a user. For example, the output unit 66 is realized by a lighting unit (light), a wind (air) output unit, a water output unit, a laser output unit and the like. In addition, the output unit 66 performs output control in accordance with control of the environment adjustment server 7.

The aforementioned moving object 6 is equipped with a micro-computer including a central processing unit (CPU), a read only memory (ROM), a random access memory (RAM) and a nonvolatile memory to control each component of the moving object 6.

<2-2. Configuration of Environment Adjustment Server>

Figure 4:
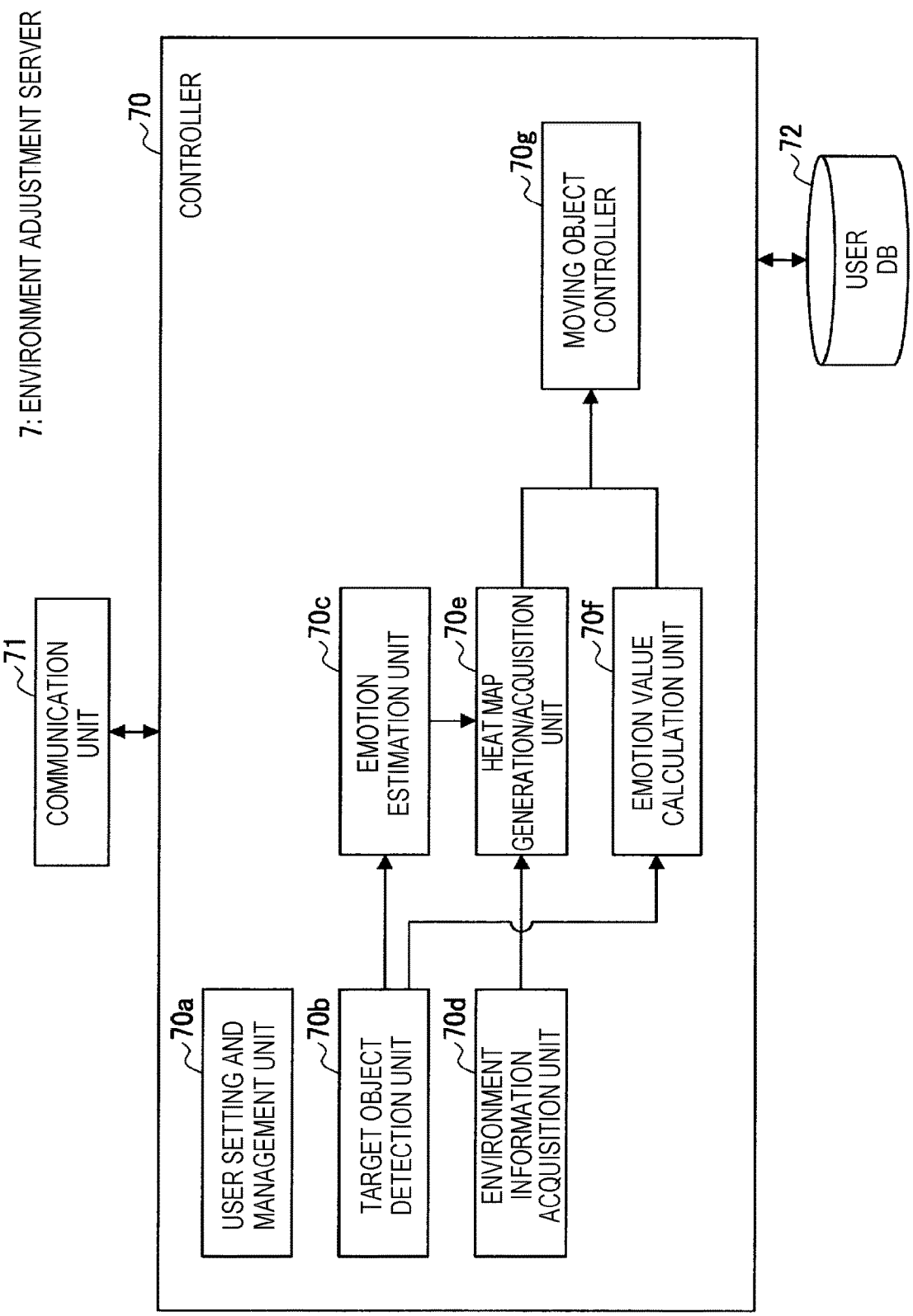
FIG. 4 is a block diagram illustrating an example of a configuration of an environment adjustment server according to the present embodiment.

FIG. 4 is a block diagram illustrating an example of a configuration of the environment adjustment server 7 according to the present embodiment. As illustrated in FIG. 4, the environment adjustment server 7 includes a communication unit 71, a controller 70 and a user DB 72.

The communication unit 71 transmits/receives data to/from an external device. Specifically, the communication unit 71 receives target object information and environment information from the moving object 6 and transmits control information for controlling movement of the moving object 6 to the moving object 6, for example. Furthermore, the communication unit 71 acquires predetermined data from the emotion server 2 and the heat map server 75 via the network 3.

The controller 70 controls each component of the environment adjustment server 7. Specifically, the controller 70 controls the moving object 6 to track a target user to change a surrounding environment of the target user depending on a user's emotion. In addition, the controller 70 is realized by a micro-computer including a CPU, a ROM, a RAM and a nonvolatile memory.

Here, the controller 70 functions as a user setting and management unit 70*a*, a target object detection unit 70*b*, an emotion estimation unit 70*c*, an environment information acquisition unit 70*d*, a heat map generation/acquisition unit 70*e*, an emotion value calculation unit 70*f* and a moving object controller 70*g*, as illustrated in FIG. 4.

The user setting and management unit 70*a* manages registration, change and deletion of information of a user who uses the present system. For example, the information of the user includes the user's name, identification number, face image, age, sex, hobbies, tastes, home address, place of work, behavior pattern and the like. Hobbies and tastes of the user may be input by the user or may be automatically set through analysis of a lifelog of the user, content uploaded to social media, text content of mails and message tools, conversations with friends and family, purchase history, schedules and the like. Furthermore, the behavior pattern of the user may be automatically set through a lifelog (specifically, past behavior history), purchase history and the like. The user setting and management unit 70*a* stores the information of the user in the user DB 72 and manages the information.

The target object detection unit 70*b* detects a person located near the moving object 6, an object carried by the person, and the like on the basis of target object sensor information transmitted from the moving object 6. Specifically, the target object detection unit 70*b* may detect the target user, for example, by analyzing a captured image transmitted from the moving object 6 and comparing the captured image with a face image of the user registered in the user DB 72. Otherwise, the target object detection unit 70*b* may detect the target user on the basis of user identification information received by the moving object 6 from a radio communication device such as the smart band 8 worn by the user. When the target user is detected, the target object detection unit 70*b* outputs a detection result to the emotion estimation unit 70*c*. The aforementioned target user detection method by the target object detection unit 70*b* is an example and the target user detection method according to the present embodiment is not limited thereto.

The emotion estimation unit 70*c* estimates an emotion of the target user detected by the target object detection unit 70*b*. Specifically, the emotion estimation unit 70*c* estimates an emotion of the target user on the basis of bio-information (pulse, temperature, volume of perspiration, brainwave and the like), for example. The bio-information is acquired by the smart band 8 illustrated in FIG. 2, transmitted from the smart band 8 to the moving object 6 and transmitted from the moving object 6 to the environment adjustment server 7.

Furthermore, the emotion estimation unit 70*c* may estimate an emotion of the target user on the basis of attributes (sex, age, height, weight, personality, occupation and the like), hobbies and tastes and a surrounding environment of the target user. In the case of a young woman, for example, an emotion of wanting to avoid exposure to direct sunlight during the daytime (worried about sunburn) and an emotion of being afraid of dark roads at night (night roads, roads on which there is no person or the like) are estimated. In addition, in the case of an office worker commuting or working, an emotion of not wanting to get wet in the rain because of important documents that he or she carries is estimated. Such information of the attributes, hobbies and tastes of the target user may be acquired from the user DB 72. The emotion estimation unit 70c outputs an estimation result to the heat map generation/acquisition unit 70e.

The environment information acquisition unit 70d acquires information about a surrounding environment from the moving object 6 through the communication unit 71. Specifically, the environment information acquisition unit 70d acquires data (latitude, longitude, altitude and the like) sensed by the environment sensor 64 of the moving object 6 as environment information. In addition, the environment information acquisition unit 70d may acquire surrounding geographic information, building information and the like from a predetermined server as environment information depending on the location (latitude and longitude information) of the moving object 6. The environment information acquisition unit 70d outputs the acquired environment information to the heat map generation/acquisition unit 70e.

The heat map generation/acquisition unit 70e generates an emotion heat map that geographically maps emotions on the basis of estimation results of the emotion estimation unit 70c and the environment information output from the environment information acquisition unit 70d. More specifically, the heat map generation/acquisition unit 70e generates an emotion heat map indicating whether there are many users having certain emotions in certain places on the basis of results of estimation of emotions of a plurality of users. In addition, the heat map generation/acquisition unit 70e may collect emotions associated with places on the basis of results obtained by analyzing content written on social media and content of mail in addition to the estimation result of the emotion estimation unit 70c. Specifically, an unpleasant feeling caused by getting wet in the rain, a feeling of frustration due to wet documents, a feeling of frustration due not being able to open one's umbrella when coming back from shopping because both hands are full, an uncomfortable feeling caused by having to take a longer path during rain than one would take in clear weather, and the like are associated with and mapped to positions.

In addition, the heat map generation/acquisition unit 70e generates an environment heat map around the current location of the target user on the basis of the environment information (latitude, longitude, altitude, geographic information, building information, etc.) output from the environment information acquisition unit 70d. More specifically, the heat map generation/acquisition unit 70e generates an environment heat map "rain" indicating places that easily get wet in the rain, an environment heat map "shadow" indicating places corresponding to shadows of buildings, etc. For example, places that easily get wet in the rain may be determined through simulation from geographical features and buildings because places that easily get wet in the rain and places that do not easily get wet are recognized according to geographic land forms (geographic information) and artificial buildings such as arcades, underground shopping centers and eaves, or may be determined on the basis of the amount of rainfall actually measured by the moving object 6 and the like. In addition, information on places that easily get wet in the rain may be manually input. Otherwise, the heat map generation/acquisition unit 70e may determine places that easily get wet in the rain by collecting the user's records of voluntarily calling the moving object 6 to the place where he or she is located for covering from rain or places that were actually wet in the rain through various sensors such as a water droplet sensor attached to the body of the user.

The heat map generated in this manner may be stored in the heat map server 75 on a network or stored in a storage unit (not shown) of the environment adjustment server 7. Furthermore, the heat map may be periodically updated.

In addition, the heat map generation/acquisition unit 70e may generate an integrated heat map of an emotion heat map and an environment heat map.

Here, various heat maps generated by the heat map generation/acquisition unit 70e are described with reference to FIGS. 5 and 6. The heat map generation/acquisition unit 70e maps predetermined environmental degrees (e.g., areas easy to be wet with rain) to a map 40 of a target area as illustrated in the left part of FIG. 5 to generate an environment heat map 41 as illustrated in the right part of FIG. 5. When the environment heat map 41 is "rain," places in darker colors get wet more easily in the rain.

Figure 5:
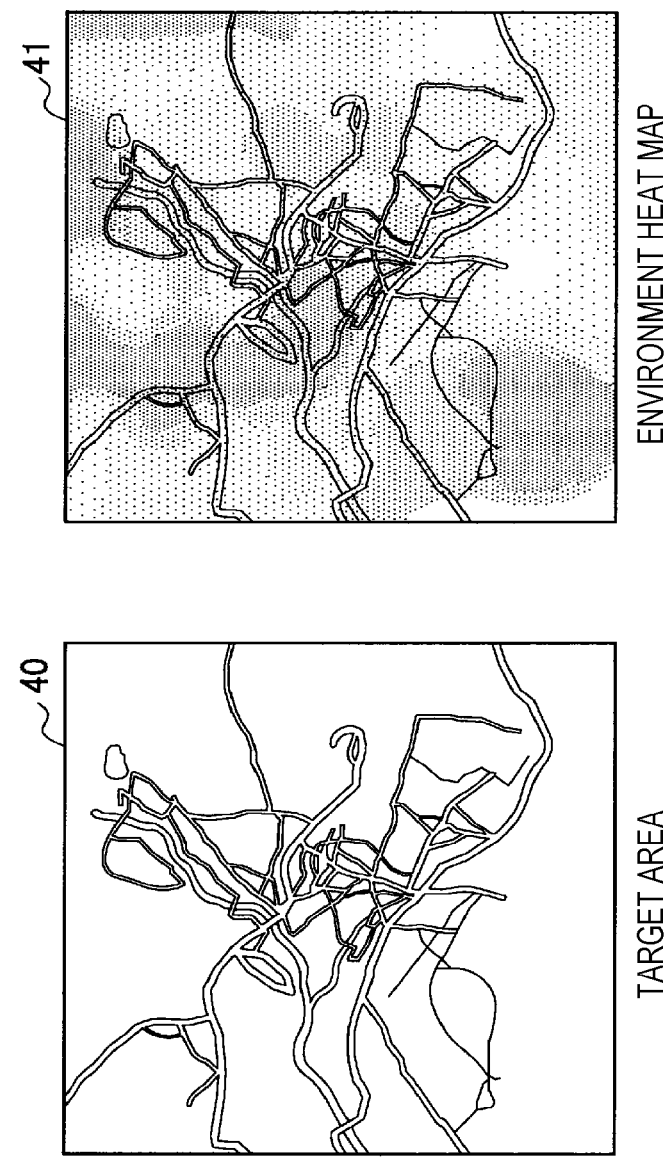
FIG. 5 is an explanatory diagram of an example of an environment heat map according to the present embodiment.
Figure 6:
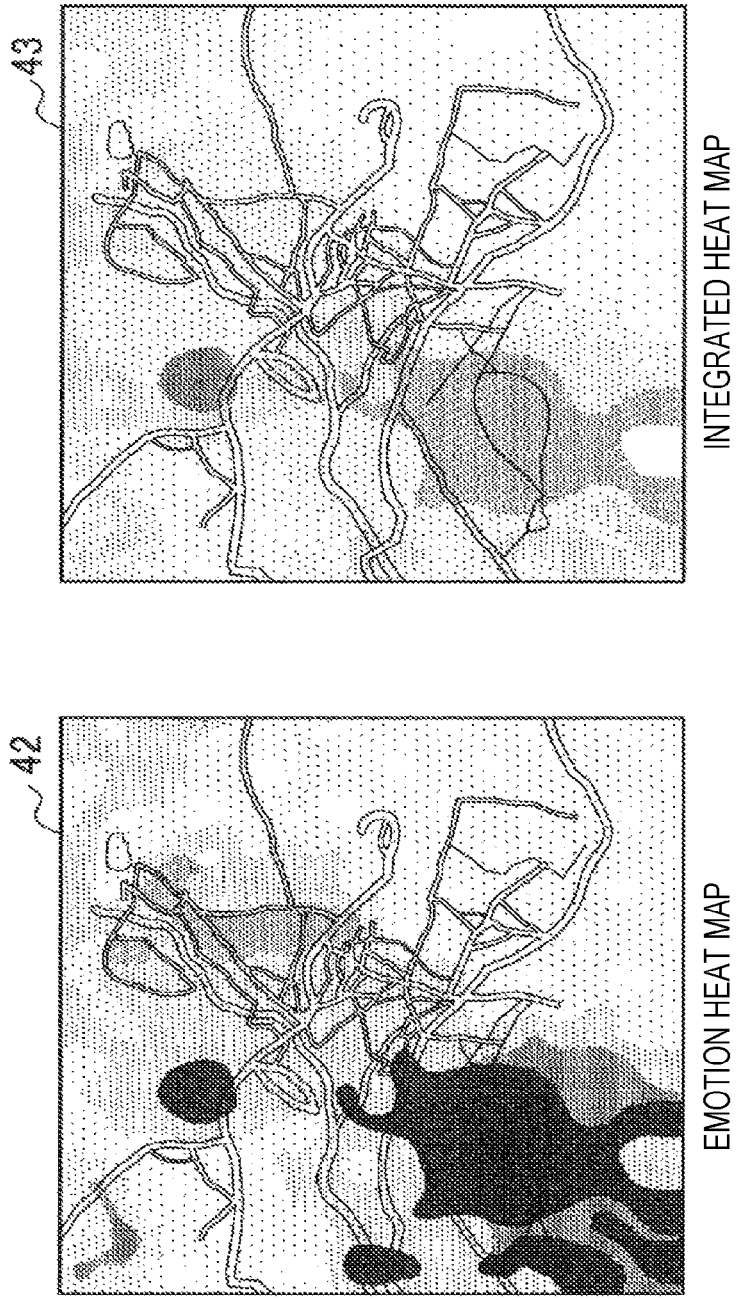
FIG. 6 is an explanatory diagram of an example of an emotion heat map and an integrated heat map according to the present embodiment.

In addition, the heat map generation/acquisition unit 70e maps a predetermined emotional degree (e.g., unpleasant emotion caused by getting wet in the rain) to the map 40 of the target area illustrated in the left part of FIG. 5 to generate an emotion heat map 42 as illustrated in the left part of FIG. 6. When the emotion heat map 42 is "unpleasant," places in darker colors indicate places where the user was more displeased or frustrated because he or she got wet in the rain.

Furthermore, the heat map generation/acquisition unit 70e integrates the environment heat map 41 and the emotion heat map 42 to generate an integrated heat map 43 as illustrated in the right part of FIG. 6. In this case, it may be possible to regard the environment heat map or the emotion heat map as important by applying a specific weight to one of the heat maps.

The integrated heat map generated in this way becomes information for determining an "area in which the value of protecting the user from rain is high" in an integrated manner.

The heat map generation/acquisition unit 70e outputs the generated integrated heat map to the moving object controller 70g.

As described above, it is desirable to update the environment heat map and the emotion heat map at fixed intervals because, when a new building is constructed, for example, places that easily get wet in the rain and places corresponding to the shade of buildings change. In addition, it is also desirable to update the emotion heat map at fixed intervals because addition of new emotions every day is considered and emotions may change depending on the season, date and time, for example, while getting wet in the rain in the summer may not cause unpleasant feelings, cold rain in the winter causes a very unpleasant feeling.

Furthermore, heat map update frequency may be different periods depending on the heat map type. For example, in the case of an ultraviolet intensity heat map, whether a certain place is exposed to the sun varies with the time of day and season. Accordingly, it is desirable to update the ultraviolet intensity map in short intervals. In addition, since ultraviolet intensity also depends on weather (cloudy, clear and the like), generation of individual ultraviolet intensity heat maps for a cloudy day and a clear day is considered.

Moreover, the heat map generation/acquisition unit 70e may predict and generate a future environment heat map using repeated season elements and information obtained from weather reports. Furthermore, the heat map generation/acquisition unit 70e may predict and generate a future environment heat map on the basis of underground passage or arcade construction plans. In addition, an environment heat map generated through prediction may be updated in real time on the basis of actual measurement values or accuracy of prediction may be increased through feedback later.

Furthermore, with respect to the emotion heat map, if periodicity such as that there are many people in office areas on weekdays and fewer people on holidays can be extracted from past emotion heat map data, for example, it is possible to predict that there will be fewer people who are frustrated about getting wet in the rain, that even a narrow area sheltered from the rain can be pleasantly traversed without getting wet in the rain (or without being exposed to ultraviolet rays) because there is no congestion, and the like.

The emotion value calculation unit 70f calculates emotion values (i.e., relative emotion values) with respect to belongings of the target user detected by the target object detection unit 70b and a person along the target user. Specifically, the emotion value calculation unit 70f acquires interaction evaluation correlated to an object ID of the target user from the emotion server 2 and calculates a relative emotion value of the target user on the basis of the interaction evaluation. Here, interaction evaluation is evaluation of an interaction (i.e., behavior) performed by the target user with respect to another person or object and may be used when feelings (referred to as emotion values in the specification) of the target user with respect to the other people or objects are calculated.

For example, evaluation of an interaction of the target user frequently maintaining a watch that he or she owns and evaluation of an interaction of storing the watch in a case specially designed therefor are stored in the emotion server 2 and the emotion value calculation unit 70f acquires such interaction evaluations of the target user and calculates emotion values. Although an evaluation value calculation method is not particularly limited, for example, interactions with a specific object (related object) of the target user may be classified by interaction types and evaluations of all interactions with respect to the specific object may be averaged using a weighting function depending on interaction type. The object ID of the target user may be acquired from the user DB 72.

The moving object controller 70h determines an area that requires environmental change on a route through which the target user moves on the basis of the integrated heat map output from the heat map generation/acquisition unit 70e and controls the moving object 6 to change a surrounding environment of the user. Determination of the area that requires environmental change is performed on the basis of whether a value of the integrated heat map is higher than a predetermined threshold value. In this manner, the surrounding environment of the target user may be locally changed by causing the moving object 6 to track the target user when the target user passes through a place where the user easily gets wet in the rain, for example, to take shelter from the rain by using the integrated heat map obtained by integrating the emotion heat map and the environment heat map, thereby allowing the target user to be in a pleasant state.

Although environment adjustment is performed by the moving object 6 such that the target user is not in an unpleasant state during movement using the integrated heat map obtained by integrating the emotion heat map in which emotion estimation results of a plurality of users are reflected and the environment heat map generated on the basis of environmental information such as geographical features in the present embodiment, the present embodiment is not limited thereto. For example, when a user's emotion becomes unpleasant, the moving object controller 70g may control the moving object 6 to locally change the surrounding environment to cause the user to have a pleasant feeling depending on an estimation result of the emotion estimation unit 70c.

Furthermore, when the surrounding environment of the target user is changed by the moving object 6, the moving object controller 70h may perform control of extending a cover range by the moving object 6 or covering belongings of the target user or a person with the target user prior to the target user depending on an emotion value (a valuing degree) with respect to the belongings of the target user or the person with the target user, obtained by the emotion value calculation unit 70f.

The configuration of the environment adjustment server 7 according to the present embodiment has been described in detail. Next, a configuration of the emotion server 2 according to the present embodiment will be described with reference to FIG. 7.

<2-3. Configuration of Emotion Server>

Figure 7:
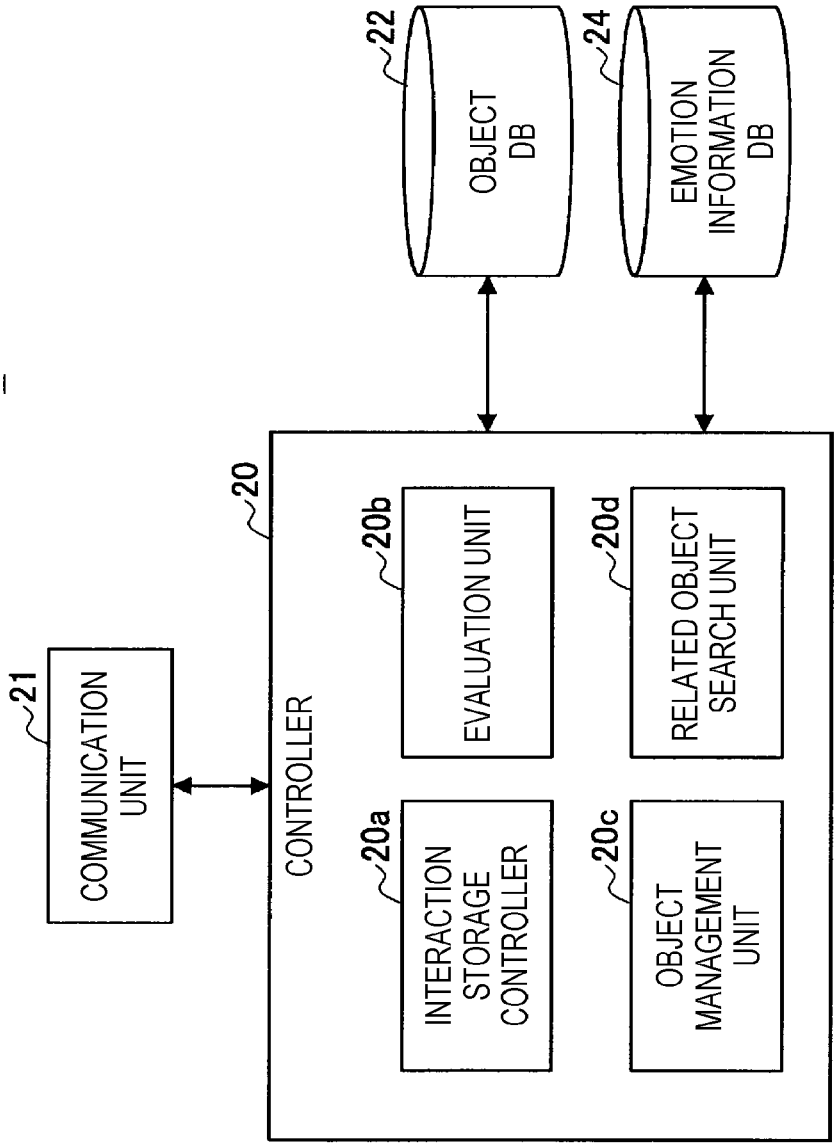
FIG. 7 is a block diagram illustrating an example of a configuration of an emotion server according to the present embodiment.

FIG. 7 is a block diagram illustrating an example of a configuration of the emotion server 2 according to the present embodiment. As illustrated in FIG. 7, the emotion server 2 includes a communication unit 21, a controller 20, an object DB 22 and an emotion information DB 24.

The communication unit 21 is connected to the environment adjustment server 7 through the network 3 and returns interaction evaluation associated with the object ID of the target user designated by the environment adjustment server 7. In addition, the communication unit 21 receives interaction information from a sensing device (not shown) attached to/mounted on each object (person or object).

The controller 20 controls each component of the emotion server 2. Furthermore, the controller 20 is realized by a micro-computer including a CPU, a ROM, a RAM and a nonvolatile memory. In addition, the controller 20 according to the present embodiment serves as an interaction storage controller 20a, an evaluation unit 20b, an object management unit 20c and a related object search unit 20d.

The interaction storage controller 20a controls interaction information received from a sensing device attached to/mounted on an object to be stored in the emotion information DB 24. The sensing device includes a humidity sensor, a temperature sensor, a vibration sensor, an infrared sensor, a camera, a tactile sensor, a gyro sensor or the like and senses an interaction of an object with another object.

The evaluation unit 20b evaluates interactions stored in the emotion information DB 24. Although an interaction evaluation method is not particularly limited, the evaluation unit 20b evaluates an interaction applied to an object as higher when the interaction is more desirable for the object, for example, and specifically assigns a score in the range of −1 to 1 thereto. The evaluation result is correlated with the interaction and stored in the emotion information DB 24.

The object management unit 20c performs management such as registration, change and deletion of information about objects stored in the object DB 22.

The related object search unit 20d searches the object DB 22 and the emotion information DB 24 for an object for which an interaction is generated with respect to a requested object ID as a related object.

The object DB 22 is a storage unit that stores an object ID of each object. In addition, the object DB 22 stores various types of information about objects, such as product names, product types, maker IDs, model numbers, and manufacturing date and time, in addition to object IDs.

The emotion information DB 24 is a storage unit that stores an interaction between objects and evaluation of the interaction.

The specific configuration of the emotion server 2 according to the present embodiment has been described.

<2-4. Environment Adjustment Operation>

Figure 8:
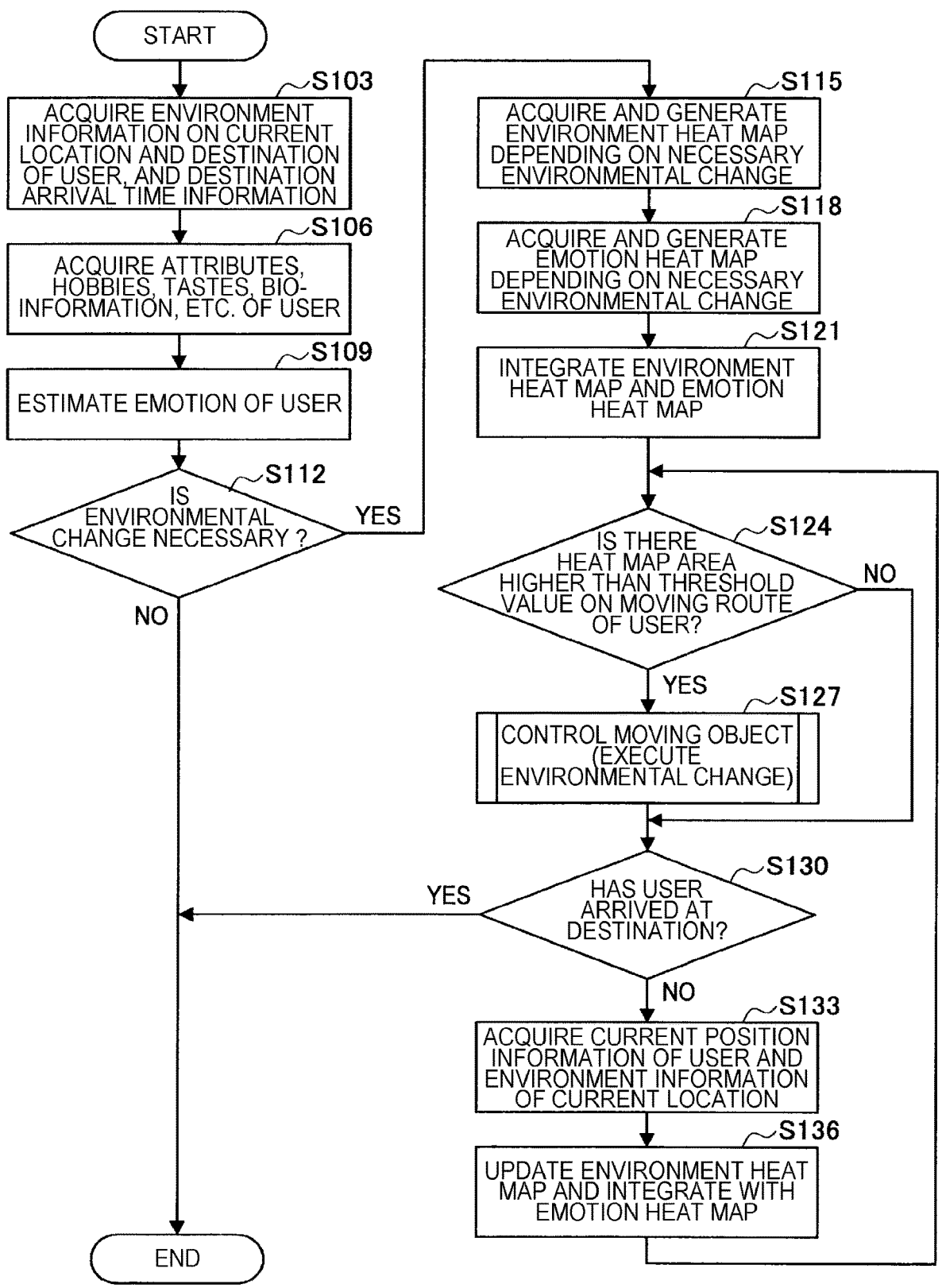
FIG. 8 is a flowchart illustrating an environment adjustment operation process of an environment adjustment system according to the present embodiment.

Next, an environment adjustment operation in the environment adjustment system including the aforementioned devices will be described with reference to FIG. 8. FIG. 8 is a flowchart illustrating an environment adjustment operation process of the environment adjustment system according to the present embodiment. The flowchart shows a flow from initiation to termination of application of environmental change when a user moves from a certain place to a destination. The environment adjustment server 7 acquires weather and the like of a moving route of the user from the destination of the user, the moving route and time, compares the weather with a user's emotion and controls the moving object 6 to change a surrounding environment of the user such that the user can move in a more pleasant state.

Specifically, first of all, the environment adjustment server 7 acquires environment information on the current location and a destination of a target user and destination arrival time information in step S103.

Subsequently, the emotion estimation unit 70*c* of the environment adjustment server 7 acquires attributes, hobbies, tastes, bio-information and the like of the user in step S106.

Next, the emotion estimation unit 70*c* estimates a user's emotion in step S109. Here, the emotion estimation unit 70*c* may estimate a user's emotion in the current environment on a route from the current location to the destination on the basis of the attributes, hobbies, tastes, bio-information and the like of the user. For example, when the user is a woman in her 30*s*, the fact that the user usually carries a parasol is extracted from the past behavior history, conversations, writing and the like and the fact that sunblock and the parasol were purchased is extracted from purchase history, it is estimated that the woman has a feeling of being worried (unpleasant emotion) about ultraviolet rays, direct sunlight and sunburn. On the other hand, when a user's taste of usually enjoying sun-tanning is extracted, it is estimated that the user has a feeling of enjoying (pleasant emotion) ultraviolet rays, direct sunlight and sun-tanning. In addition, the emotion estimation unit 70*c* may estimate a user's emotion (pleasant/unpleasant feeling) for the current surrounding environment on the basis of bio-information (body temperature, pulse, heartbeat, volume of perspiration, brainwaves, etc.) of the user.

Subsequently, the controller 70 of the environment adjustment server 7 determines whether environmental change is necessary on the basis of the estimation result in step S112. Specifically, when the user has a feeling of worrying (unpleasant emotion) about ultraviolet rays, direct sunlight and sunburn, for example, the controller 70 determines that environmental change is necessary if weather of the current location and destination is clear and there is exposure to direct sunlight. On the other hand, when the user has a feeling of enjoying (pleasant emotion) sun-tanning, the controller 70 determines that environmental change is not necessary if weather of the current location and destination is clear and there is exposure to direct sunlight. In this manner, whether the user has a pleasant emotion or an unpleasant emotion for a specific environment depends on attributes, hobbies, tastes and the like of the user, and the controller 70 may determine whether environmental change is necessary from the attributes, hobbies, tastes, bio-information and the like of the user.

Next, when environmental change is necessary ("Yes" in S112), the heat map generation/acquisition unit 70*e* acquires and generates an environment heat map depending on necessary environmental change in step S115. For example, the heat map generation/acquisition unit 70*e* acquires, from the heat map server 75, an environment heat map indicating a place easily exposed to direct sunlight in an area including the moving route from the current location to the destination when environmental change for shielding ultraviolet rays and direct sunlight is necessary. In addition, the heat map generation/acquisition unit 70*e* may reflect current environment information on the current location and the destination in the acquired environment heat map to update the environment heat map. Furthermore, the heat map generation/acquisition unit 70*e* may generate the corresponding environment heat map on the basis of the current environment information on the current location and the destination and the like when the corresponding environment heat map cannot be acquired.

Subsequently, the heat map generation/acquisition unit 70*e* acquires and generates an emotion heat map depending on necessary environmental change in step S118. For example, the heat map generation/acquisition unit 70*e* acquires, from the heat map server 75, an emotion heat map indicating emotions of a plurality of users that are worried about ultraviolet rays and direct sunlight, unpleasant emotions due to exposure to direct sunlight and the like in an area including the moving route from the current location to the destination. In addition, the heat map generation/acquisition unit 70*e* may reflect the current emotion of the target user in the acquired emotion heat map to update the emotion heat map. Furthermore, the heat map generation/acquisition unit 70*e* may generate the corresponding emotion heat map on the basis of the current emotion of the target user and the like when the corresponding emotion heat map cannot be acquired.

Thereafter, the heat map generation/acquisition unit 70*e* integrates the acquired environment heat map and emotion heat map to generate an integrated heat map in step S121. For example, an area in which the need to protect the target user from direct sunlight is high recognized by integrating places where an unpleasant emotion due to exposure to direct sunlight occurs and places easily exposed to direct sunlight. The heat map generation/acquisition unit 70*e* outputs the generated integrated heat map to the moving object controller 70*g*.

Subsequently, the moving object controller 70*g* determines whether there is a heat map area higher than a threshold value on the moving route of the user with reference to the integrated heat map in step S124.

Thereafter, when there is a heat map area higher than the threshold value ("Yes" in S124), the moving object controller 70*g* controls the moving object 6 to change a surrounding environment of the target user in step S127. Specifically, the moving object controller 70*g* causes the moving object 6 to track the target user to fly at a position for covering from rain or sunlight, to blow warm/cold wind, to turn on a light or to play music to change the surrounding environment of the target user. Environmental change will be described in detail later.

Then, the environment adjustment server 7 determines whether the user has arrived at the destination in step S130. When the user has arrived at the destination, the environment adjustment operation is ended and thus the moving object controller 70g controls the moving object 6 to return a predetermined base station, for example.

When the user has not arrived at the destination ("No" in S130), the environment adjustment server 7 acquires current position information of the user and environment information of the current location through the target object detection unit 70b and the environment information acquisition unit 70d in step S133.

Then, the heat map generation/acquisition unit 70e updates the environment heat map on the basis of the acquired environment information and integrates the environment heat map with the emotion heat map to update the integrated heat map in step S136. The updated integrated heat map is output to the moving object controller 70g and steps S124 to S136 are repeated until the user arrives at the destination.

The operation process of the environment adjustment system according to the present embodiment has been described in detail. Next, specific examples of environmental change according to the present embodiment will be described below through a plurality of specific examples.

<<3. Examples of Environmental Change>>
<3-1. Covering From Rain and Sunlight>

First of all, cases in which environmental changes of covering from rain and sunlight by the moving object 6 will be described with reference to FIGS. 9 to 16.

FIG. 9 is an explanatory diagram of an overview of covering from rain and sunlight by the moving object 6 of the present embodiment. As illustrated in FIG. 9, when the moving object 6 is a flying object, the moving object may fly and track a moving user while remaining above the user to function as an umbrella (moving object 6-1) or a parasol (moving object 6-2) such that the user is not exposed to rain or direct sunlight, thereby locally changing a surrounding environment of the user.

Figure 11:
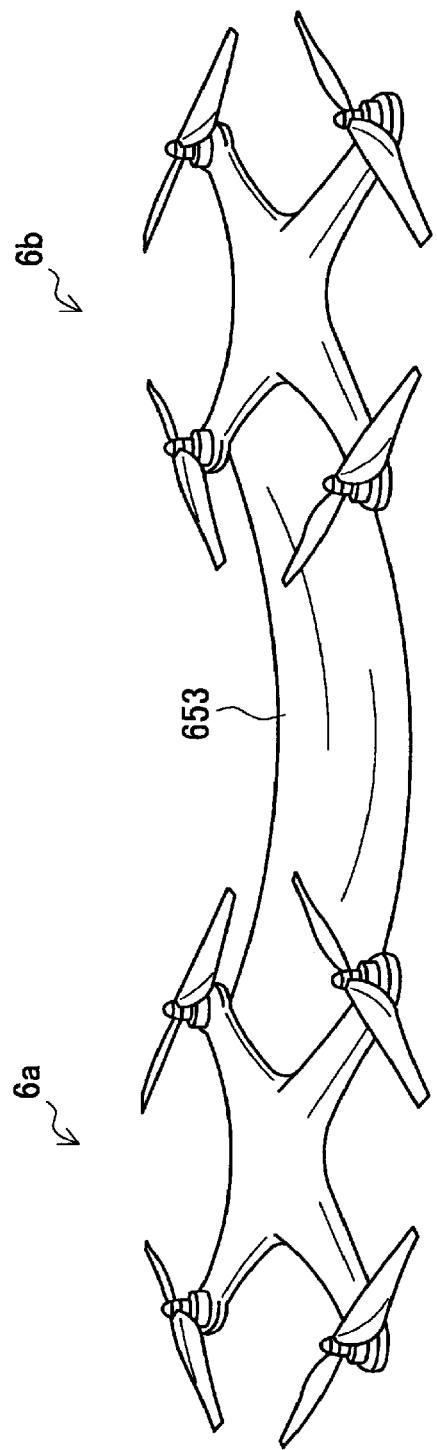
FIG. 11 is an explanatory diagram of extension of a cover range by a plurality of moving objects of the present embodiment.

Here, the moving object 6 may include the transformation controller 65 for extending a cover range, as described above, and extend the cover range for covering from rain or sunlight through transformation control to apply environmental change to a friend with the target user, a stroller, large baggage or the like. The cover range of the moving object 6 may be extended by changing the size of the moving object 6 with a plate member 651 that extends from the center of the moving object 6 in a circular form, for example, as illustrated in FIG. 10. Otherwise, a plurality of moving objects 6a and 6b may be connected, as illustrated in FIG. 11, to cover a wider range. Specifically, to extend a cover range of a master moving object 6a, another moving object 6b in the vicinity of the master moving object 6a is called and a sheet 653 provided in the moving object 6a is connected to the moving object 6b when they approach each other (e.g., a magnet provided in a joint of the moving object 6b is ON or the like). Then, the cover range can be extended by the sheet 653 by controlling both of the moving objects to fly a predetermined distance away from each other, as illustrated in FIG. 11. The slave moving object 6b may fly in the same flying pattern of the master moving object 6a.

Such a cover range may be manually set by the target user or automatically set by the moving object controller 70g of the environment adjustment server 7 by tracking through face recognition, extracting characteristics of clothes or belongings from a captured image or extracting specific markers attached to belongings or the like.

(Operation Process For Covering From Rain)

Figure 12:
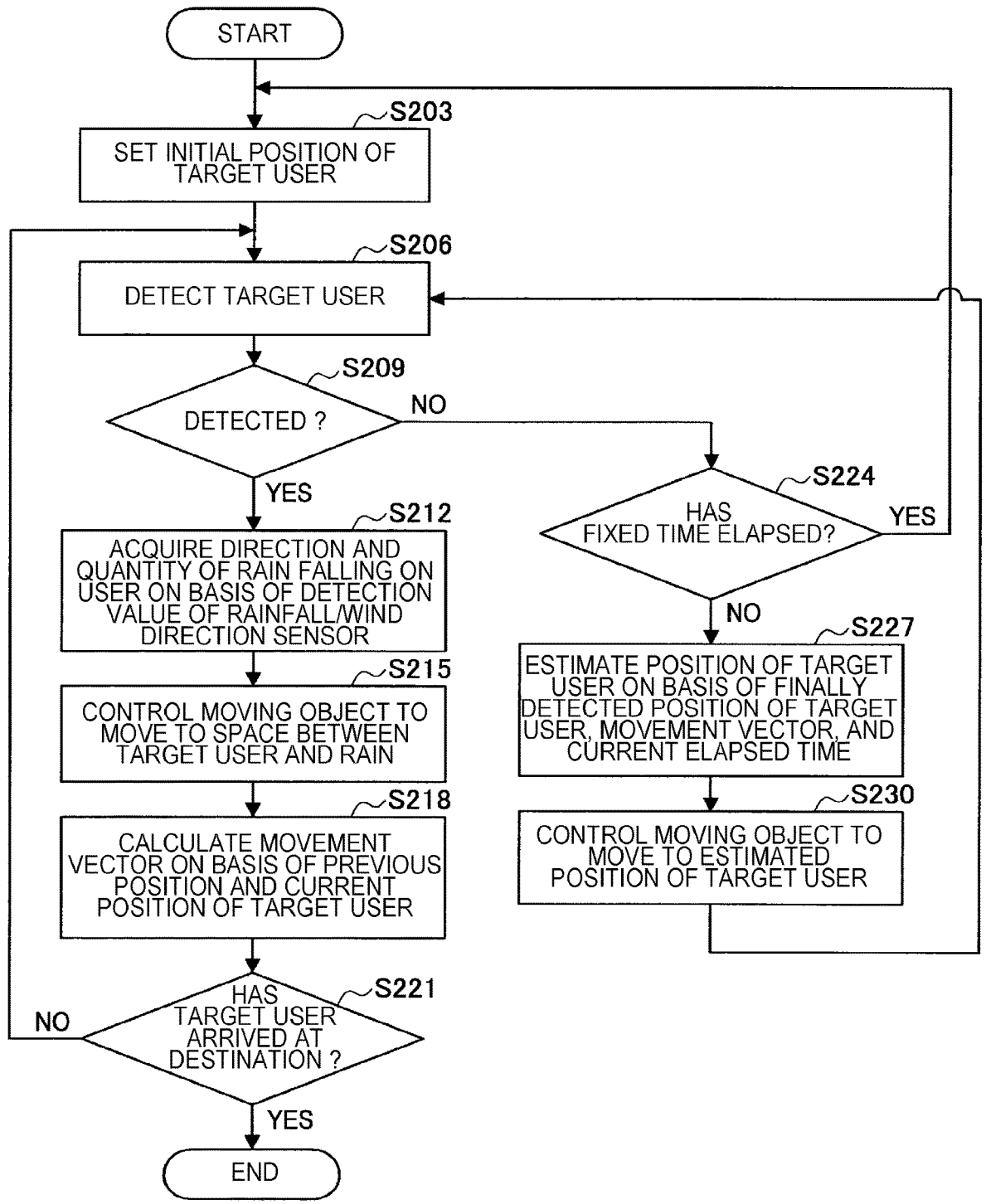
FIG. 12 is a flowchart illustrating an operation process of environmental change of covering from rain according to the present embodiment.

Next, an operation process when environmental change for covering from rain is performed by the moving object 6-1 will be described with reference to FIG. 12. FIG. 12 is a flowchart illustrating an operation process of environmental change for covering from rain according to the present embodiment.

As illustrated in FIG. 12, first of all, the moving object controller 70g of the environment adjustment server 7 sets an initial position of the target user in step 203. As described above with reference to FIG. 8, the moving object controller 70g determines an area that requires environmental change on a moving route from the current location of the target user to a destination and controls the moving object 6-1. In this case, when the target user passes through the area that requires environmental change, the moving object controller 70g sets the corresponding target area as the initial position of the target user and causes the moving object 6-1 having a base station near the target area as a starting point to start to fly. The present embodiment is based on a situation in which each moving object 6-1 having a base station installed outdoors and the like as a starting point flies, and when the target user moves to the next area, a moving object 6-1' flying having a base station installed in the next area as a starting point tracks the target user. However, the present embodiment is not limited thereto and, for example, the moving object 6-1 owned by the target user may be controlled to continuously track the target user during movement of the target user.

Next, the target user is detected by the moving object 6-1 in step S206. Specifically, image analysis is performed by the target object detection unit 70b of the environment adjustment server 7 on the basis of a captured image captured by the camera 62a included in the target object sensor 62 of the moving object 6 to recognize a face image of the target user to detect the target user, for example. In addition, target user detection accuracy may be increased by detecting a marker (e.g., an infrared reflector or an infrared LED) or the like attached to the target user through the infrared camera 62b.

Subsequently, when the target user is detected ("Yes" in S209), the moving object controller 70g acquires the direction and quantity of rain (rainfall unit vector Rv(x, y, z) of rain shown in FIG. 13) falling on the target user on the basis of a detection value of a rainfall/wind direction sensor (an example of the environment sensor 64) provided in the moving object 6-1 in step S212.

Thereafter, the moving object controller 70g controls the moving object 6-1 to perform covering from rain by moving the moving object 6-1 to a space between the target user and rain. Here, a relative position to which the moving object 6-1 is moved with respect to the target user is obtained as follows.

Figure 13:
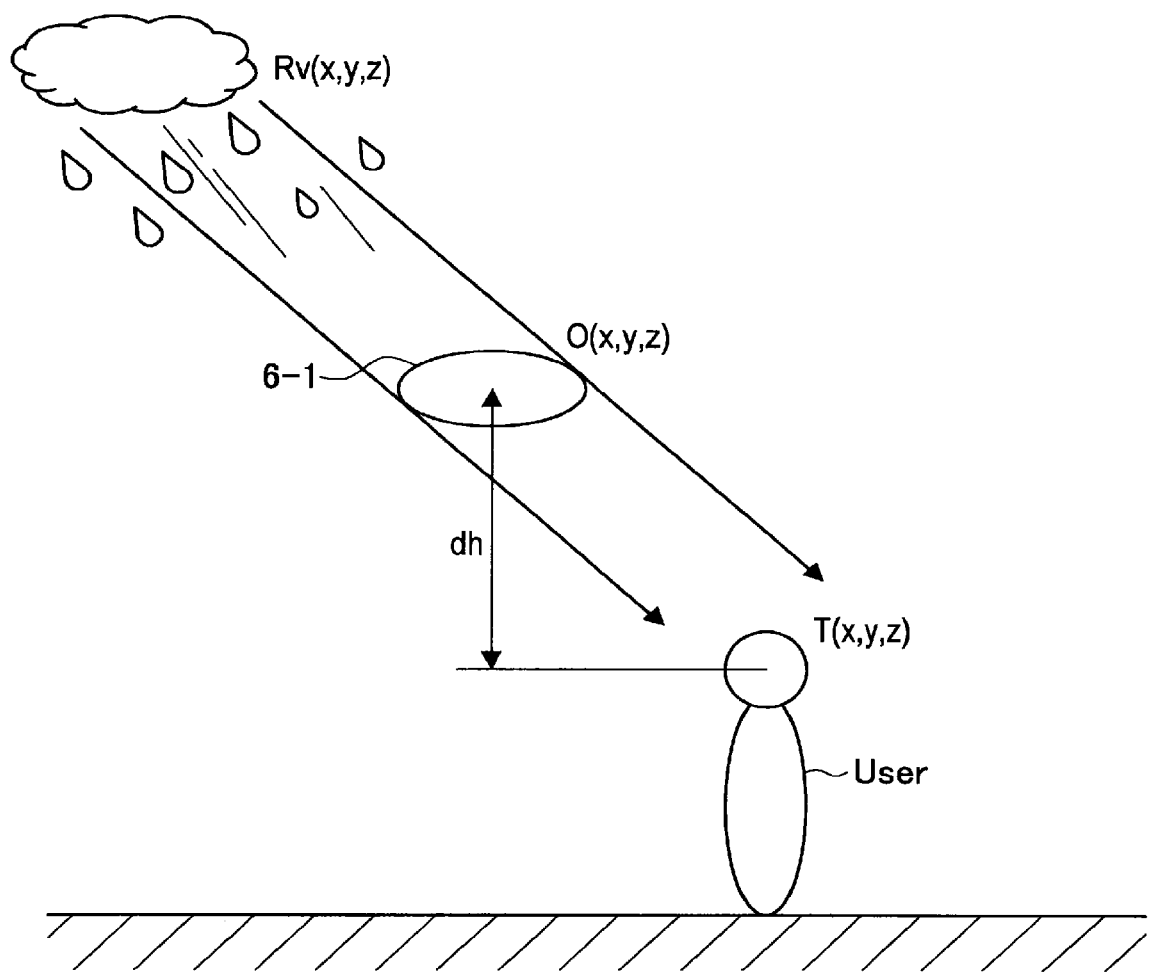
FIG. 13 is an explanatory diagram of calculation of a relative position of a moving object with respect to a target user during covering from rain.

FIG. 13 is an explanatory diagram of calculation of a relative position of the moving object 6-1 with respect to the target user during covering from rain. As illustrated in FIG. 13, the position O(x, y, z) of the moving object 6-1 is obtained according to the following formula 1 using a direction Rv(x, y, z) of rainfall, the position T(x, y, z) of the target user and a height dh obtained by subtracting the height of the target user from the altitude of the moving object 6-1. Rv_z indicates a z component of Rv.

$$O = (T - Rv \cdot dh/Rv\_z)$$ (Formula 1)

The moving object controller 70g controls the moving object 6-1 to move to the obtained position O(x, y, z). In addition, when a wide range needs to be covered such as when there are a plurality of users, the moving object controller 70g controls the cover range to be extended by connecting a plurality of moving objects 6-1 or transforming the moving object 6-1.

Thereafter, the moving object controller 70g calculates a movement vector of the target user on the basis of the previous position and the present position of the target user in step S218. In addition, the moving object 6-1 flies and tracks the target user while maintaining the relative position O(x, y, z) with respect to the target user and keeps sight of the target user while tracking the target user through the camera 62a or receiving radio waves (Bluetooth (registered trademark) or Wi-Fi (registered trademark)) transmitted from a communication terminal (a smart device, a smartphone or the like) owned by the target user through the radio signal receiver 62c.

Subsequently, the moving object controller 70g determines whether the target user has arrived at the destination in step S221 and terminates tracking flight and environment adjustment control by the moving object 6-1 when the target user has arrived at the destination.

On the other hand, when the target user is not detected ("No" in S209), the moving object controller 70g estimates the current location of the target user moving to the destination on the basis of the finally detected position of the target user, a movement vector calculated at that time, and current elapsed time in step S227 if a fixed time has not elapsed ("No" in S224).

Then, the moving object controller 70g controls the moving object 6-1 to move to the estimated current location of the target user in step S230.

When the fixed time has elapsed without the target user being detected ("Yes" in S224), the moving object controller 70g sets the initial position of the target user again (S203).
(Operation Process For Covering From Sunlight)

Figure 14:
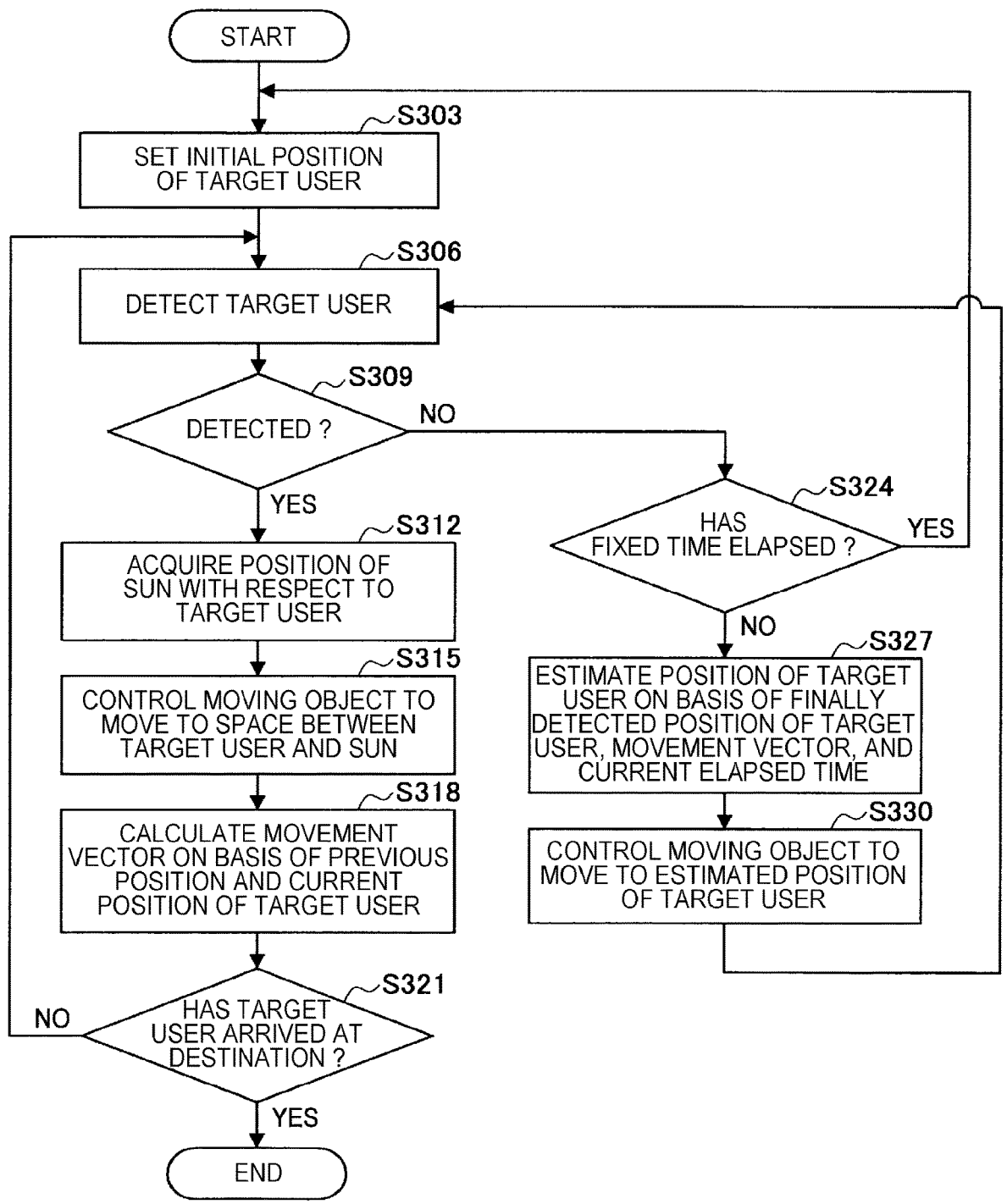
FIG. 14 is a flowchart illustrating an operation process of environmental change of covering from sunlight according to the present embodiment.

Next, an operation process when environmental change for covering from sunlight is performed by the moving object 6-2 will be described with reference to FIG. 14. FIG. 14 is a flowchart illustrating an operation process of environmental change for covering from sunlight according to the present embodiment. Description of the same process as the operation process for covering from rain illustrated in FIG. 12 is simplified.

As illustrated in FIG. 14, first of all, the moving object controller 70g of the environment adjustment server 7 sets an initial position of the target user in step S303.

Then, the target user is detected by the moving object 6-2 in step S306.

Subsequently, when the target user is detected ("Yes" in S309), the moving object controller 70g acquires a position of the sun and a direction of sunlight (sunlight unit vector Sv(x, y, z) illustrated in FIG. 15) with respect to the target user on the basis of detection values of an illuminance sensor, a sun azimuth acquisition unit and a calendar/clock unit (examples of the environment sensor 64) provided in the moving object 6-2 in step S312. The sun azimuth acquisition unit corresponding to an example of the environment sensor 64 may acquire the position and direction of the sun from current position information (latitude, longitude and altitude) acquired through the latitude-longitude positioning unit 64a and the altitude sensor 64b and current date and time information detected from the calendar/clock unit.

Next, the moving object controller 70g controls the moving object 6-2 to perform covering from sunlight by moving the moving object 6-2 to a space between the target user and the sun in step S315. Here, a relative position to which the moving object 6-2 is moved with respect to the target user is obtained as follows.

Figure 15:
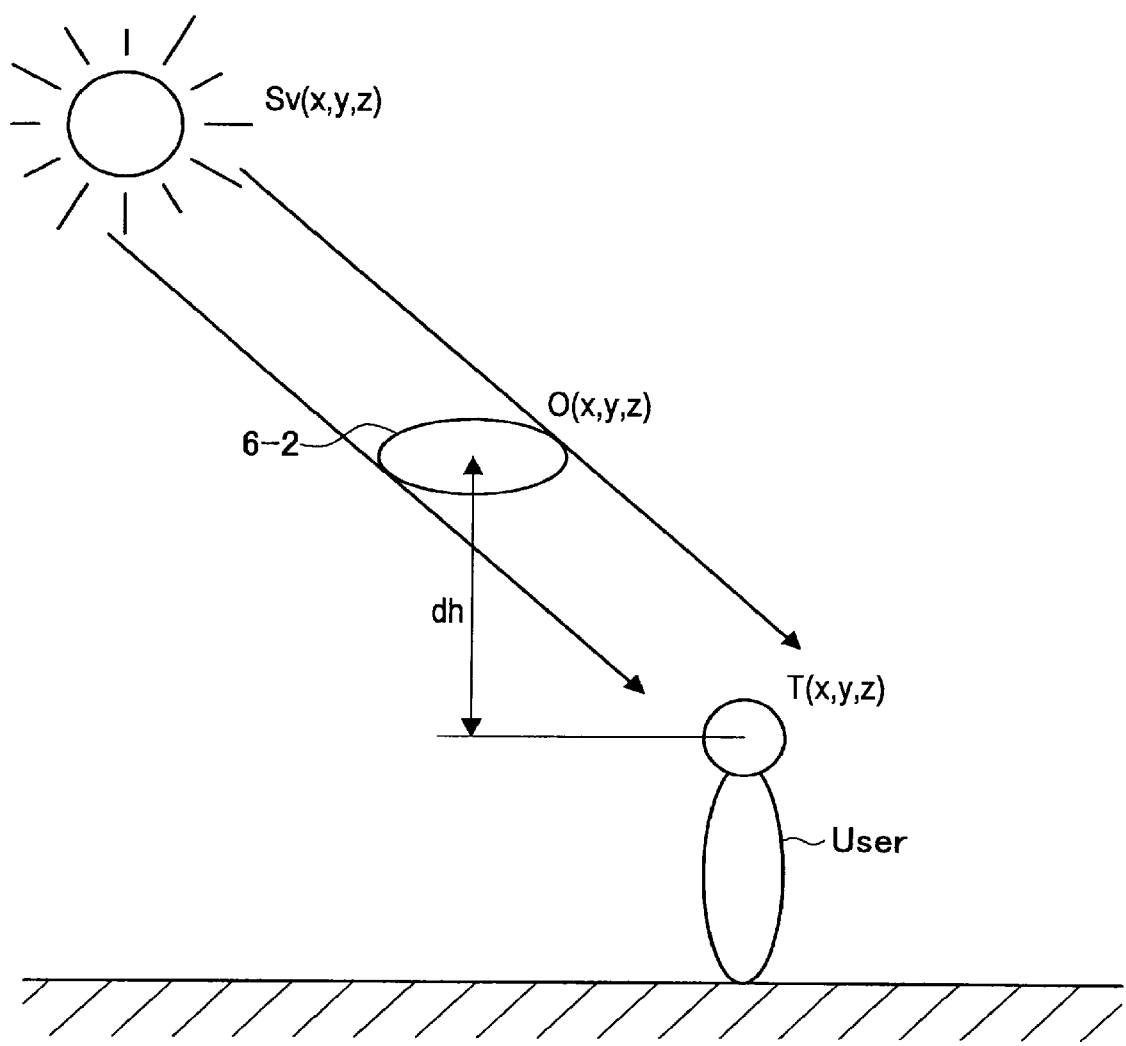
FIG. 15 is an explanatory diagram of calculation of a relative position of a moving object with respect to a target user during covering from sunlight.

FIG. 15 is an explanatory diagram of calculation of a relative position of the moving object 6-2 with respect to the target user during covering from sunlight. As illustrated in FIG. 15, the position O(x, y, z) of the moving object 6-2 is acquired according to the following formula 2 using the direction Rv(x, y, z) of sunlight, the position T(x, y, z) of the target user and a height dh obtained by subtracting the height of the target user from the altitude of the moving object 6-2. Sv_z indicates a z component of Sv.

$$O=(T-Sv \cdot dh/Sv\_z)$$ (Formula 2)

The moving object controller 70g controls the moving object 6-2 to the position O(x, y, z) acquired in this manner.

Thereafter, the moving object controller 70g calculates a movement vector of the target user on the basis of the previous position and the current position of the target user in step S318. In addition, the moving object 6-2 flies and tracks the target user while maintaining the relative position O(x, y, z) with respect to the target user and keeps sight of the target user while tracking the target user through the camera 62a or receiving radio waves (Bluetooth (registered trademark) or Wi-Fi (registered trademark)) transmitted from a communication terminal (a smart device, a smartphone or the like) owned by the target user.

Subsequently, the moving object controller 70g determines whether the target user has arrived at the destination in step S321 and terminates tracking flight and environment adjustment control by the moving object 6-2 when the target user has arrived at the destination.

On the other hand, when the target user is not detected ("No" in S309), the moving object controller 70g estimates the current location of the target user moving to the destination on the basis of the finally detected position of the target user, a movement vector calculated at that time, and current elapsed time in step S327 if a fixed time has not elapsed ("No" in S324).

Then, the moving object controller 70g controls the moving object 6-2 to move to the estimated current location of the target user in step S330.

When the fixed time has elapsed without the target user being detected ("Yes" in S324), the moving object controller 70g sets the initial position of the target user again (S303).
(Change of Cover Range Based on Emotion Value)

In the present embodiment, the cover range may be changed on the basis of an emotion value of the target user. Accordingly, environmental change depending on a feeling of the target user may be provided by preferentially covering an object important to the target user's daily life, covering a person important to the target user, and the like. This will be described in detail with reference to FIG. 16.

Figure 16:
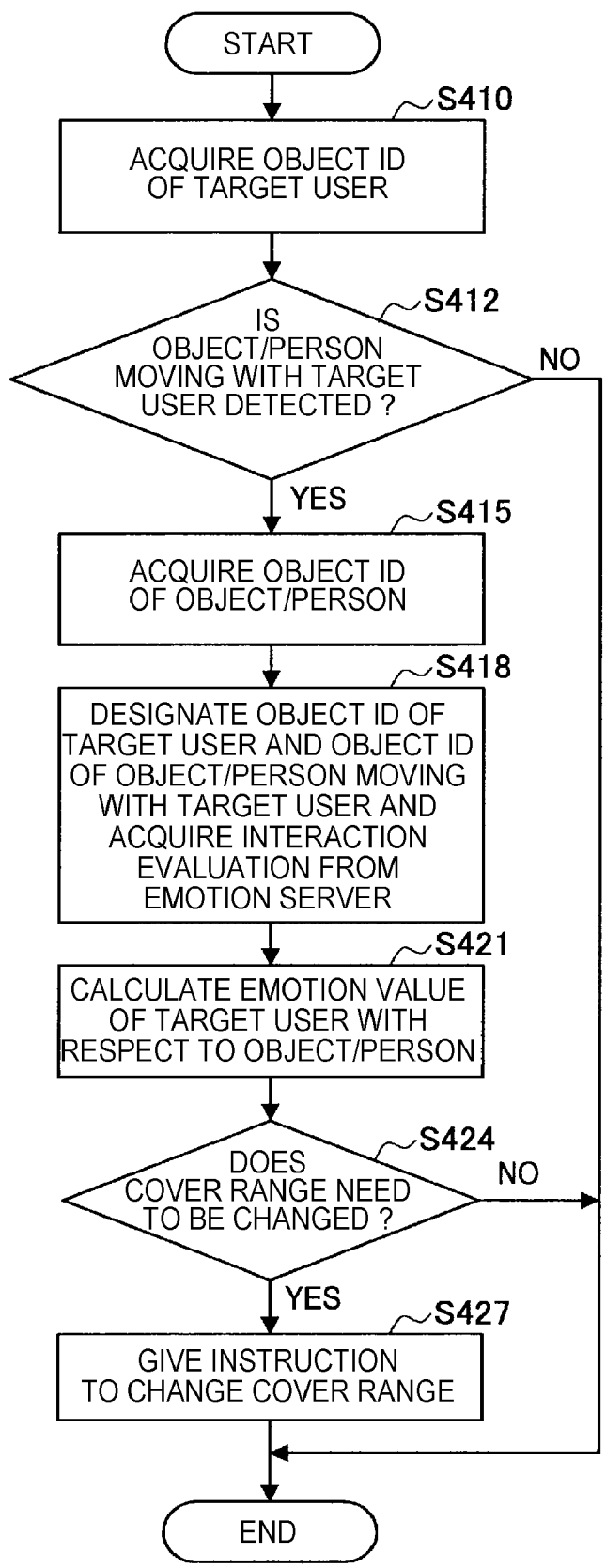
FIG. 16 is a flowchart illustrating a process of changing a cover range on the basis of an emotion value according to the present embodiment.

FIG. 16 is a flowchart illustrating a process of changing the cover range on the basis of an emotion value according to the present embodiment. As illustrated in FIG. 16, first of all, the emotion value calculation unit 70f of the environment adjustment server 7 acquires an object ID of the target user in step S410.

Next, an object (such as a stroller or baggage) moving with the target user or a person moving with the target user is detected by the target object detection unit 70b in step S412.

Subsequently, the emotion value calculation unit 70f acquires an object ID of the detected object or person in step S415. This object ID (also referred to as a related object ID) may be previously registered in the user DB 72 or may be searched for in the object DB 22 by the related object search unit 20d (refer to FIG. 7) inquiring of the emotion server 2 on the basis of a result of analysis of a captured image acquired by the camera 62a of the moving object 6.

Then, the emotion value calculation unit 70f designates the object ID of the target user and the object ID of the object or person moving with the target user and acquires interaction evaluation between the target user and the object or person from the emotion server 2. The interaction evaluation is an evaluation value (e.g., a numerical value in the range of −1.0 to 1.0) of a behavior such as a conversation or mail of the target user with respect to the person or a behavior such as storage, maintenance, wearing or appreciation of the object by the target user.

Subsequently, the emotion value calculation unit 70f calculates an emotion value of the target user with respect to the object/person in step S421. Although an emotion value calculation formula is not particularly limited, interactions of the target user with a specific object (related object) may be classified by interaction types and interaction evaluations for the specific object may be averaged using a weighting function depending on interaction type (refer to the following formula), for example.

$$\text{Ave}(\omega_{intA}\cdot(\text{Ave}(E_{intA}\cdot TW(t))), \omega_{intB}\cdot(\text{Ave}(E_{intB}\cdot TW(t))), \omega_{intC}\cdot(\text{Ave}(E_{intC}\cdot TW(t))), \ldots)$$ (Formula 3)

Here,
$\omega_{intA}$: Weight of interaction A
$E_{intA}$=Evaluation value of interaction A
TW(t): Weighting function of elapsed time for evaluation value The above formula 3 corresponds to a case in which an emotion value is calculated on the basis of an interaction evaluation between persons and uses a weighting function TW(t) of elapsed time for an evaluation value. t specifies interaction time (or evaluation time) and weighting is performed depending on a time elapsed from when an interaction is performed. This is because a recent interaction is considered as more important than a past interaction in the case of a relation between persons.

Next, the moving object controller 70g determines whether the cover range needs to be changed on the basis of the emotion value calculated by the emotion value calculation unit 70f in step S424. Specifically, the moving object controller 70g determines that the object/person is covered along with the target user or covered prior to the target user when a relative emotion value of the target user with respect to the object/person is higher than a threshold value.

When the cover range needs to be changed ("Yes" in S424), the moving object controller 70g instructs the moving object 6 to change the cover range in step S427.

According to the present embodiment, as described above, when the target user walks while carrying a valued antique, for example, the antique can be covered by the moving object 6 such that the antique is not exposed to the sun or rain. When the target user is with a child or a friend, they can share the cover range.

<3-2. Lighting>

Figure 17:
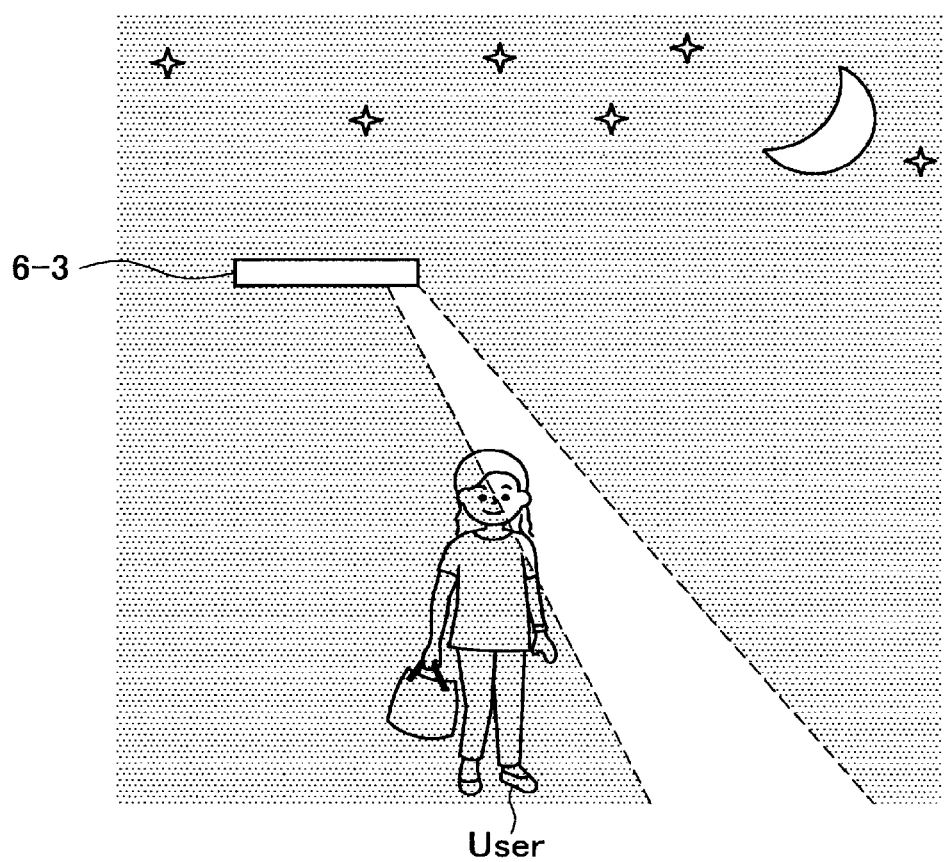
FIG. 17 is an explanatory diagram of lighting control by the moving object of the present embodiment.

Next, other environment adjustment control by the moving object 6 of the present embodiment will be described. FIG. 17 is an explanatory diagram of lighting control by a moving object 6-3 of the present embodiment. As illustrated in FIG. 17, it is possible to comfort the target user by performing environment adjustment control of lighting up a road around the target user by the moving object 6-3 when an emotion of being afraid to walk on a dark road at night is estimated. This will be described in detail with reference to FIG. 18.

Figure 18:
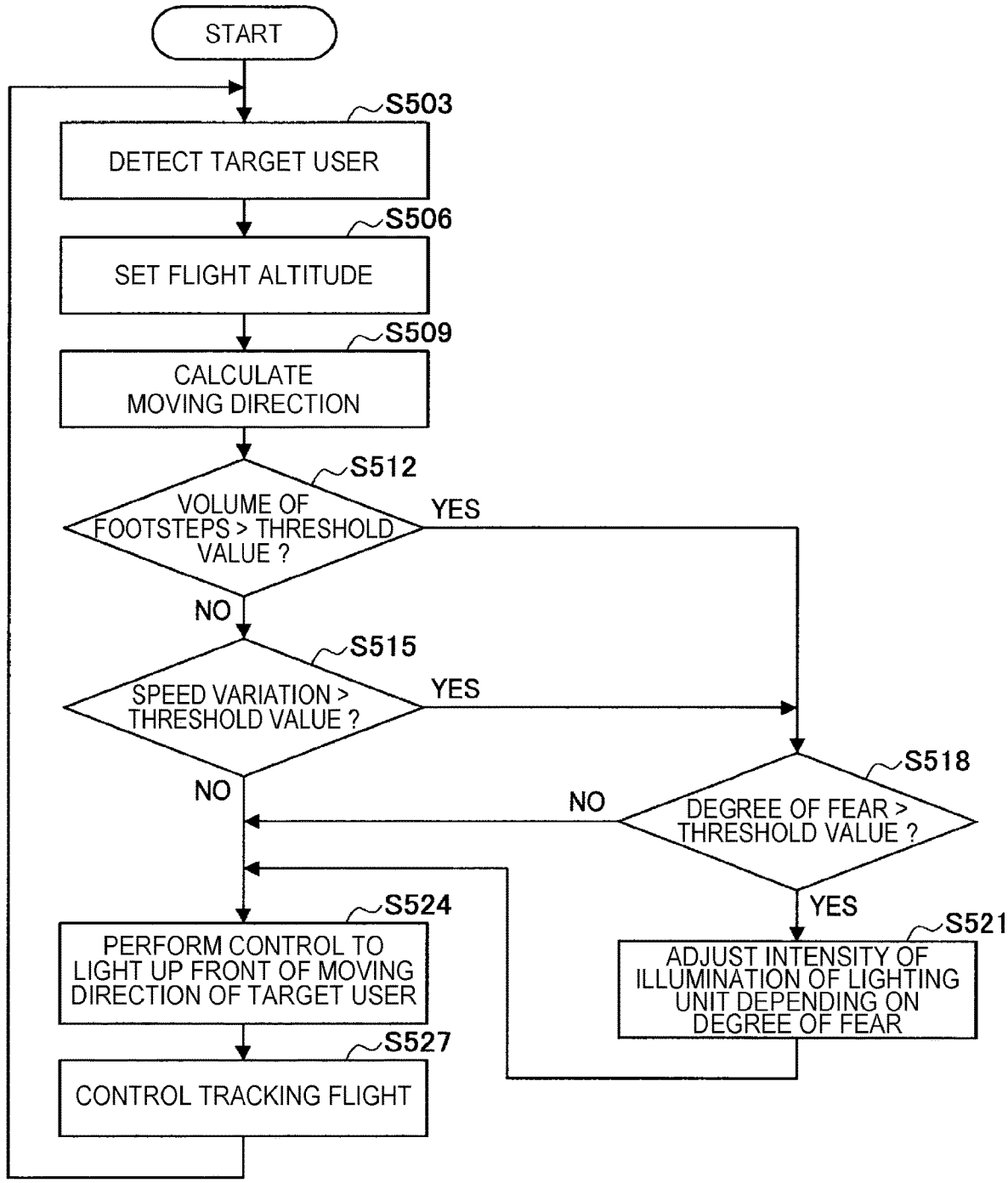
FIG. 18 is a flowchart illustrating a lighting control process by the moving object of the present embodiment.

FIG. 18 is a flowchart illustrating a lighting control process by the moving object 6-3 of the present embodiment. As illustrated in FIG. 18, first of all, the moving object controller 70g of the environment adjustment server 7 causes the moving object 6-3 to fly to the set initial position of the target user to detect the target user through the target object detection unit 70b on the basis of a captured image of the infrared camera 62b (for a night road) of the moving object 6-3 and the like in step S503.

Subsequently, the moving object controller 70g sets a flight altitude of the moving object 6-3 in step S506. The flight altitude may be previously set.

Next, the moving object controller 70g calculates a moving direction (unit vector Fv) of the target user in step S509.

Thereafter, the moving object controller 70g determines whether the volume of footsteps of the target user is greater than a threshold value on the basis of audio data acquired through the microphone array 62d of the moving object 6-3 in step S512.

In addition, the moving object controller 70g determines whether a moving speed variation of the target user exceeds a threshold value on the basis of a capture image acquired by the infrared camera 62b of the moving object 6-3 or the like in step S515.

When the footsteps are louder than the threshold value ("Yes" in S512) or the moving speed variation exceeds the threshold value ("Yes" in S515), the moving object controller 70g determines whether a degree of fear of the target user exceeds a threshold value in step S518. When a person walks alone on a road at night, the pedestrian who feels fear increases his or her walking speed or his or her footsteps grow louder. Accordingly, such information becomes a barometer of a degree of fear of a surrounding environment. Furthermore, a degree of fear may be calculated depending on a variation in bio-information of the user, for example, the heart rate. The heart rate of the user may be acquired through the smart band 8 worn by the user. Otherwise, areas that particularly scare the user according to collective intelligence or personal attributes may be specified from an integrated heat map (e.g., integration of an emotion heat map indicating a feeling of fear and an environment heat map indicating places in which there is little traffic and danger easily occurs) to calculate a degree of fear.

When the degree of fear exceeds the threshold value ("Yes" in S518), the moving object controller 70g performs adjustment of increasing the intensity of illumination through a lighting unit (an example of the output unit 66) or extending an illumination range in step S521. Otherwise, the moving object controller 70g controls a speaker (an example of the output unit 66) to sound an alarm.

Subsequently, after adjustment depending on the degree of fear or when the volume of the footsteps or speed variation does not exceed the threshold value, the moving object controller 70g controls the lighting unit (an example of the output unit 66) to light up the front of the moving direction of the target user in step S524. Here, a lighting direction and a lighting position according to the moving object 6-3 are obtained as follows, for example.

Figure 19:
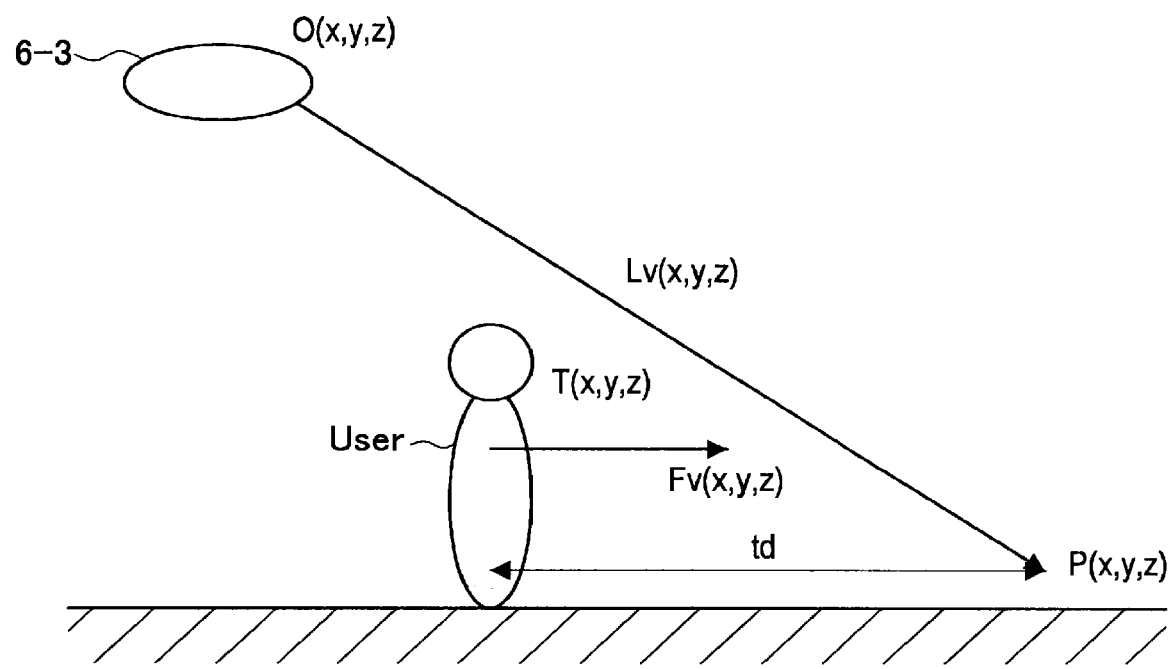
FIG. 19 is an explanatory diagram of calculation of a lighting direction (angle) and position of the moving object during lighting.

FIG. 19 is an explanatory diagram of calculation of a lighting direction (angle) and position of the moving object 6-3 during lighting. As illustrated in FIG. 19, when the position O(x, y, z) of the moving object 6-3, the position T(x, y, z) of the target user, a moving direction unit vector Fv(x, y, z) and a distance td between the target user and a lighting position are preset as specified values, the lighting position P is obtained according to the following formula 4.

$$P=T+Fv\cdot td$$ (Formula 4)

Accordingly, a lighting angle unit vector Lv according to the lighting unit is obtained according to the following formula 5.

$$Lv=(P-0)/|P-0| \quad \text{(Formula 5)}$$

In addition, the moving object controller 70g causes the moving object 6-3 to fly while tracking the target user, maintain the lighting angle Lv of the lighting unit with respect to the target user, and keep sight of the target user while tracking the target user through the infrared camera 62b or receiving radio waves (Bluetooth (registered trademark) or Wi-Fi (registered trademark)) transmitted from a communication terminal (a smart device, a smartphone or the like) owned by the target user.

<3-3. Output of Wind, Water and the like>

Furthermore, the moving object 6 according to the present embodiment may cause the target user to have a pleasant feeling by emitting warm wind, cold wind, air, a mosquito repellent, water or the like from the output unit 66 to provide a pleasant environment on a hot/cold day, to block cigarette smoke or pollen or to deter insects such as mosquito. Whether the target user has an unpleasant feeling due to heat, cold, cigarette smoke, insects or the like may be estimated by the emotion estimation unit 70c on the basis of attributes, hobbies, tastes, bio-information and the like of the target user. In addition, sensing of a surrounding environment is performed by a humidity sensor, a temperature sensor, an air quality sensor, a pollen sensor, an odor sensor or the like, which are examples of the environment sensor 64, in the present embodiment.

An embodiment of changing a surrounding environment of the target user by wind, water or the like will be described in detail below with reference to FIGS. 20 to 23.

(Air Curtain)

Figure 20:
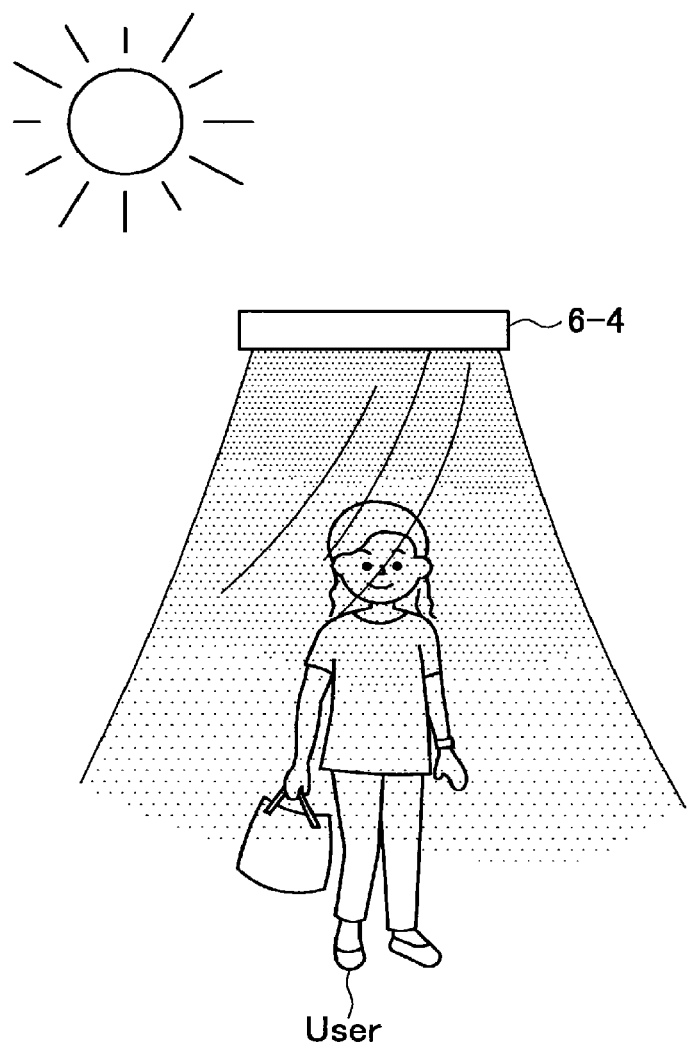
FIG. 20 is an explanatory diagram of environmental change by an air curtain according to the present embodiment.

FIG. 20 is an explanatory diagram of environmental change through an air curtain according to the present embodiment. As illustrated in FIG. 20, a moving object 6-4 flying and tracking the target user may change the environment to a pleasant environment by outputting cold wind from a wind output unit (an example of the output unit 66) when the target user has an unpleasant feeling due to sweating in a hot day. Furthermore, when the target user has an unpleasant feeling because he or she has a predisposition to mosquito bites and there are insects near him or her, the moving object 6-4 may change the environment to a pleasant environment by spraying mosquito repellent chemicals.

Figure 21:
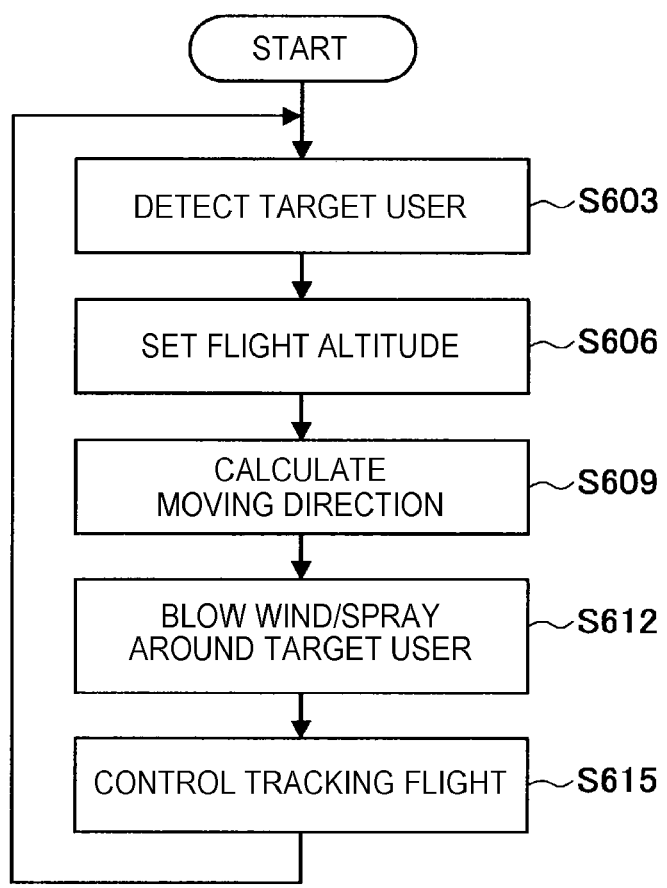
FIG. 21 is a flowchart illustrating an operation process of environmental change by the air curtain according to the present embodiment.

FIG. 21 is a flowchart illustrating an operation process for environmental change using the air curtain according to the present embodiment. As illustrated in FIG. 21, first of all, the moving object controller 70g of the environment adjustment server 7 causes the moving object 6-4 to fly to the set initial position of the target user to detect the target user through the target object detection unit 70b on the basis of a captured image of the camera 62a of the moving object 6-4 or the like in step S603.

Then, the moving object controller 70g sets a flight altitude of the moving object 6-4 in step S606. The flight altitude may be previously set.

Subsequently, the moving object controller 70g calculates a moving direction of the target user in step S609.

Thereafter, the moving object controller 70g controls the moving object 6-4 to output (blow) cold/warm wind or to spray mosquito repellent chemicals around the target user in step S612. An air flow rate and temperature are adjusted on the basis of an emotion of the target user, surrounding humidity, temperature and the like.

In addition, the moving object controller 70g controls the moving object 6-3 to fly and track the target user in step S615.

(Blocking Cigarette Smoke)

Figure 22:
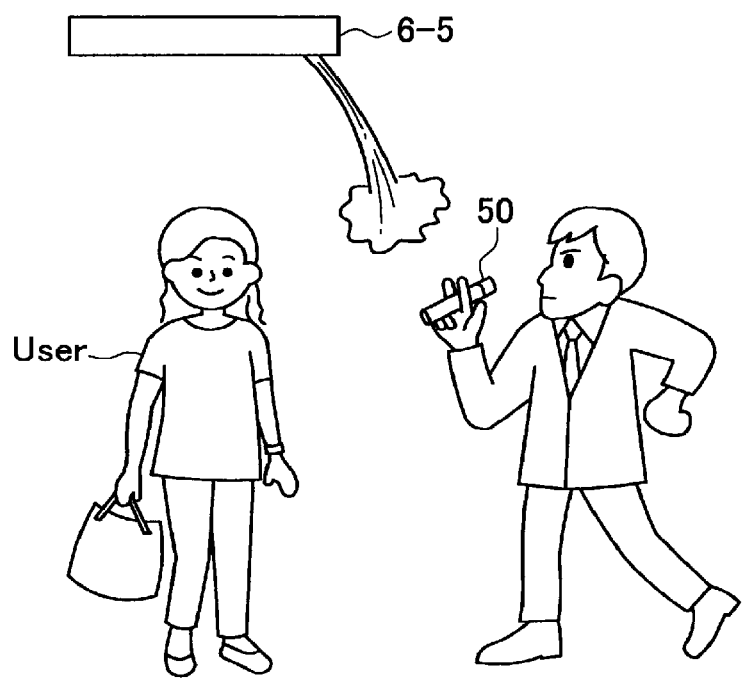
FIG. 22 is an explanatory diagram of environmental change by smoke blocking according to the present embodiment.

Next, environmental change through cigarette smoke blocking by a moving object 6-5 will be described with reference to FIGS. 22 and 23. Although cigarette smoke blocking may be realized through the aforementioned air curtain, the moving object 6-5 may discharge water to extinguish a cigarette 50 close thereto, as illustrated in FIG. 22. Water discharge control may be performed only for areas in which smoking is banned on roads according to regulations or the like.

Figure 23:
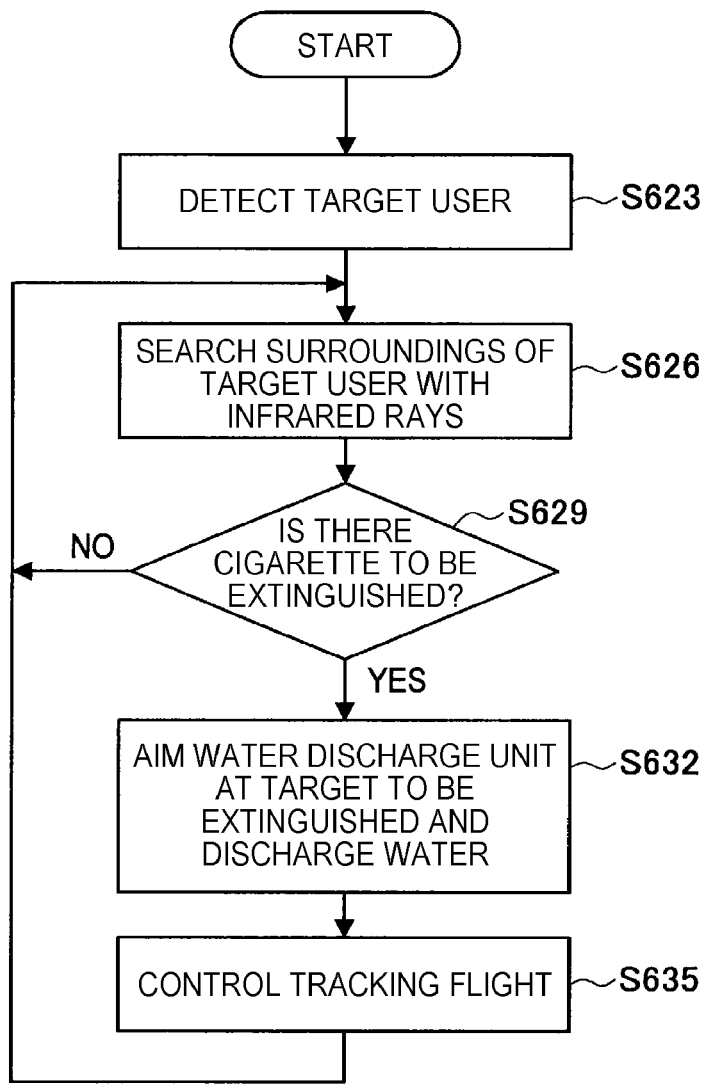
FIG. 23 is a flowchart illustrating an operation process of environmental change by smoke blocking according to the present embodiment.

FIG. 23 is a flowchart illustrating an operation process for environmental change through smoke blocking according to the present embodiment. As illustrated in FIG. 23, first of all, the moving object controller 70g of the environment adjustment server 7 causes the moving object 6-5 to fly to the set initial position of the target user to detect the target user through the target object detection unit 70b on the basis of a capture image of the camera 62a of the moving object 6-5 or the like in step S623.

Then, the moving object controller 70g searches for the light of a cigarette by infrared-ray-searching 360° around the moving object 6-5 on the basis of a captured image of the infrared camera 62b of the moving object 6-5 or the like in step S626. Otherwise, the moving object controller 70g may measure a wind direction using a wind direction sensor provided in the moving object 6-5 and intensively search for a windward direction of smoke flowing toward the target user with infrared rays.

Subsequently, a cigarette to be extinguished is detected by the target object detection unit 70b in step S629.

Thereafter, when the cigarette to be extinguished is detected ("Yes" in S629), the moving object controller 70g instructs the moving object 6-5 to discharge water from the water discharge unit (an example of the output unit 66) to extinguish the cigarette in step S632.

In addition, the moving object controller 70g controls the moving object 6-5 to fly and track the target user in step S635.

<3-4. Music Playback>

In addition, the moving object 6 according to the present embodiment may provide a pleasant environment by playing music through a speaker (an example of the output unit 66). For example, when the emotion estimation unit 70c estimates that the target user has a depressed feeling or an unpleasant feeling due to surrounding noise, favorite music of the target user may be played through the moving object 6 depending on attributes, hobbies and tastes of the target user to cause the target user to have a pleasant feeling.

Figure 24:
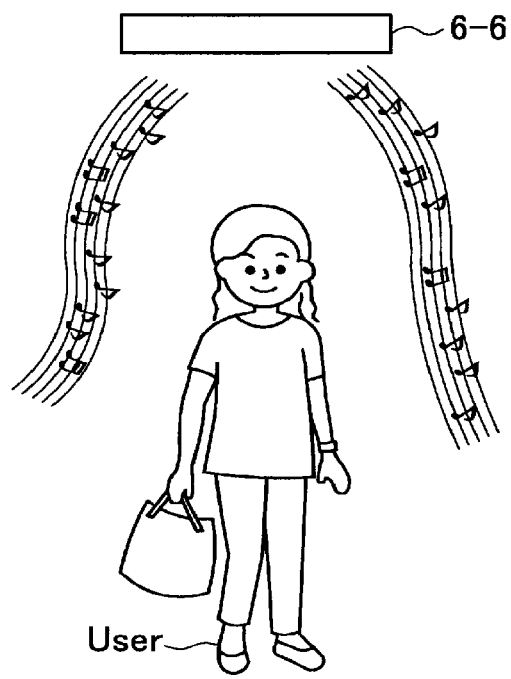
FIG. 24 is an explanatory diagram of environmental change by music playback according to the present embodiment.

Specifically, a moving object 6-6 flying and tracking the target user plays music above the target user, as illustrated in FIG. 24. Accordingly, the target user listens to the music without wearing a headphone speaker or an earphone speaker and thus can simultaneously hear surrounding environmental sounds and obtain effects of increased safety when walking or jogging. In addition, it is possible to enjoy music even when riding a bicycle, during which use of a headphone speaker or an earphone speaker is legally banned. Furthermore, it is also possible to cause only the target user located under the moving object 6-6 to hear the music by using this technology with a speaker array or beamforming technology.

Figure 25:
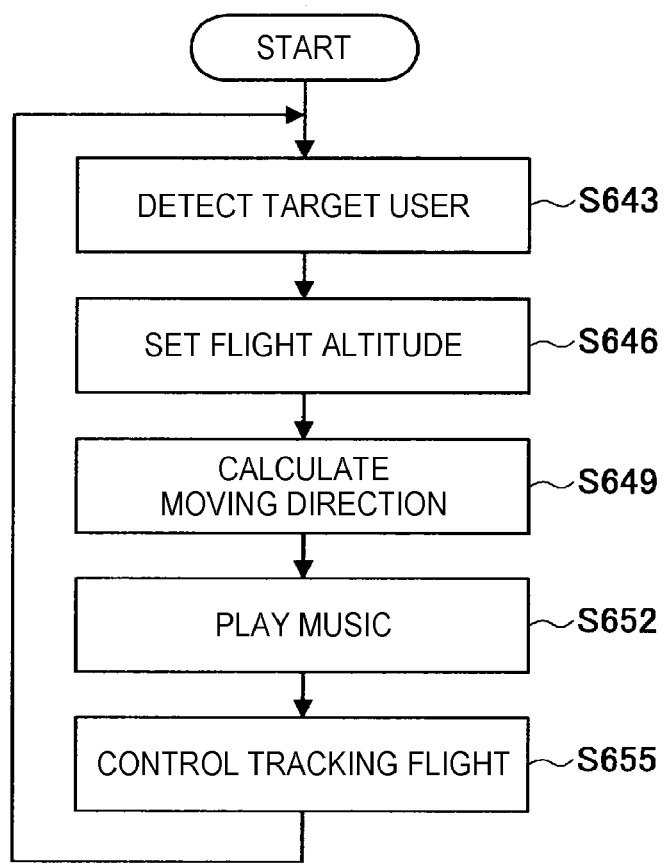
FIG. 25 is a flowchart illustrating an operation process of environmental change by music playback according to the present embodiment.

FIG. 25 is a flowchart illustrating an operation process for environmental change through music playback according to the present embodiment. As illustrated in FIG. 25, first of all, the moving object controller 70g of the environment adjustment server 7 causes the moving object 6-6 to fly to the set initial position of the target user to detect the target user through the target object detection unit 70b on the basis of a captured image of the camera 62a of the moving object 6-6 or the like in step S643.

Then, the moving object controller 70g sets a flight altitude of the moving object 6-6 in step S646. The flight altitude may be previously set.

Subsequently, the moving object controller 70g calculates a moving direction of the target user in step S649.

Thereafter, the moving object controller 70g instructs the moving object 6-6 to play music through a speaker (an example of the output unit 66) in step S652. Played music may be selected on the basis of hobbies, tastes and past music play history of the target user.

In addition, the moving object controller 70g controls the moving object 6-6 to fly and track the target user in step S655.

<<4. Conclusion>>

As described above, in the environment adjustment system 1 according to embodiments of the present disclosure, a surrounding environment can be locally changed depending on an emotion of a target user by causing the moving object 6 to track the moving target user.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, a computer program for causing hardware such as CPUs, ROMs and RAMs included in the aforementioned moving object 6 and environment adjustment server 7 to exhibit functions of the moving object 6 and environment adjustment server 7 may be written. In addition, a computer-readable storage medium having the computer program stored therein may be provided.

Furthermore, although movement of the moving object 6 is controlled by the environment adjustment server 7 in the embodiment described above, the environment adjustment system according to the present embodiment is not limited thereto and movement control may be performed by a controller (CPU) of the moving object 6. For example, the moving object 6 may have at least some functional components (the target object detection unit 70b, the environment information acquisition unit 70d, the emotion estimation unit 70c, the heat map generation/acquisition unit 70e, the emotion value calculation unit 70f and the moving object controller 70g) included in the environment adjustment server 7 illustrated in FIG. 4.

Additionally, functions of at least two moving objects 6 from among the moving objects 6-1 to 6-6 may be combined. For example, two environment changes of covering from rain and lighting up a night road are provided in the case of a road on a rainy night. In this case, the moving object controller 70g may predict a flight time and a time for which each function is used from an integrated heat map and select necessary functions, battery capacity and a fuselage.

Furthermore, environmental change by the environment adjustment system of the present embodiment can be realized by projection of a picture, sound shielding, absorption of gases, absorption of liquids, emission of heat, control of a robot arm and the like in addition to avoidance of a falling object overhead (e.g., covering from rain), covering from light (e.g., covering from sunlight), irradiation of light, voice output, blow of wind, sprouting of water and spraying of chemicals.

Moreover, although an emotion value is calculated by the emotion value calculation unit 70f of the environment adjustment server 7 in the environment adjustment system 1 according to the present embodiment, the present disclosure is not limited thereto and an emotion value may be calculated by the emotion server 2.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A control system including:
    an estimation unit that estimates an emotion of a user; and
    a moving object controller that controls a moving object to change a surrounding environment of the user depending on the estimated emotion.

(2)

The control system according to (1), wherein the estimation unit estimates the emotion of the user on the basis of bio-information of the user.

(3)

The control system according to (1) or (2), wherein the estimation unit estimates the emotion of the user on the basis of attributes, hobbies and tastes of the user.

(4)

The control system according to (3), wherein the estimation unit estimates the emotion of the user with reference to a surrounding environment of the user.

(5)

The control system according to any one of (1) to (4), further including an emotion value calculation unit that calculates an emotion value of the user with respect to a specific object on the basis of interaction evaluation for the specific object.

(6)

The control system according to (5), wherein the moving object controller performs control to adjust a change range depending on the emotion value with respect to the specific object.

(7)

The control system according to any one of (1) to (6), further including a generation unit that generates an emotion heat map on the basis of emotions of a plurality of users estimated by the estimation unit,
    wherein the moving object controller controls the moving object to change the surrounding environment of the user depending on the emotion heat map.

(8)

The control system according to (7),
    wherein the generation unit generates an environment heat map on the basis of information on the surrounding environment of the user, and
    the moving object controller controls the moving object to change the surrounding environment of the user depending on the emotion heat map and the environment heat map.

(9)

The control system according to (8), wherein the generation unit predicts and generates a future emotion heat map or environment heat map.

(10)

The control system according to any one of (1) to (9), wherein, when the estimation unit estimates that the user has an unpleasant emotion, the moving object controller controls the moving object to change the surrounding environment of the user such that the user has a pleasant emotion.

(11)

The control system according to (10), wherein, when the estimation unit estimates that an emotion of the user with respect to a specific environment is unpleasant, the moving object controller controls the moving object to change the specific environment around the user such that the user has a pleasant emotion.

(12)

The control system according to (11), wherein the moving object controller determines an area in which an environment is to be changed on a moving route to a destination on the basis of an emotion heat map and an environment heat map depending on the estimated emotion of the user with respect to the specific environment, and controls a moving object in charge of the area to change a surrounding environment of the user.

(13)

The control system according to any one of (1) to (12), wherein the moving object is a flying object, a ground moving object or a moving object in water.

(14)

A control method including:
estimating an emotion of a user; and
controlling a moving object to change a surrounding environment of the user depending on the estimated emotion.

(15)

A storage medium having a program stored therein, the program causing a computer to function as:
an estimation unit that estimates an emotion of a user; and
a moving object controller that controls a moving object to change a surrounding environment of the user depending on the estimated emotion.

REFERENCE SIGNS LIST 1 environment adjustment system
2 emotion server
20 controller
20a interaction storage controller
20b evaluation unit
20c object management unit
20d related object search unit
21 communication unit
22 object DB
24 emotion information DB
3 network
6 moving object
61 communication unit
62 target object sensor
63 moving object controller
64 environment sensor
65 transformation controller
66 output unit
7 environment adjustment server
70 controller
70a user setting and management unit
70b target object detection unit
70c emotion estimation unit
70d environment information acquisition unit
70e heat map generation/acquisition unit
70f emotion value calculation unit
70g moving object controller
71 communication unit
72 user DB

The invention claimed is:

1. A control system comprising:
circuitry configured to:
estimate an emotion of a user;
generate a relationship between estimated emotions of a plurality of users and an environment of the user by mapping the estimated emotions of the plurality of users to locations of the plurality of users in the environment of the user; and
control a moving object to change a surrounding environment of the user depending on the estimated emotion and the generated relationship.

2. The control system according to claim 1, wherein the circuitry is configured to estimate the emotion of the user on the basis of bio-information of the user.

3. The control system according to claim 2, wherein the bio-information includes at least one of a pulse, a temperature, a volume of perspiration, a brainwave, and a heartbeat.

4. The control system according to claim 1, wherein the circuitry is configured to estimate the emotion of the user on the basis of attributes, hobbies, and tastes of the user.

5. The control system according to claim 4, wherein the circuitry is configured to estimate the emotion of the user with reference to the surrounding environment of the user.

6. The control system according to claim 1, wherein the circuitry is further configured to calculate an emotion value of the user with respect to a specific object on the basis of an interaction evaluation for the specific object.

7. The control system according to claim 6, wherein the circuitry is configured to perform control to adjust a change range depending on the emotion value with respect to the specific object.

8. The control system according to claim 1, wherein
the mapping of the estimated emotions of the plurality of users to locations of the plurality of users in the environment of the user includes generating an emotion heat map on the basis of the estimated emotions of the plurality of users, and
the circuitry is further configured to control the moving object to change the surrounding environment of the user depending on the emotion heat map.

9. The control system according to claim 8, wherein the circuitry is configured to:
generate an environment heat map on the basis of information on the surrounding environment of the user, and
control the moving object to change the surrounding environment of the user depending on the emotion heat map and the environment heat map.

10. The control system according to claim 9, wherein the circuitry is configured to predict and generate a future emotion heat map or environment heat map.

11. The control system according to claim 1, wherein, when the circuitry estimates that the user has an unpleasant emotion, the circuitry controls the moving object to change the surrounding environment of the user to result in the user having a pleasant emotion.

12. The control system according to claim 11, wherein, when the circuitry estimates that an emotion of the user with respect to a specific environment is unpleasant, the circuitry controls the moving object to change the specific environment around the user to result in the user having a pleasant emotion.

13. The control system according to claim 12, wherein the circuitry is configured to:
- determine an area in which an environment is to be changed on a moving route to a destination on the basis of an emotion heat map and an environment heat map depending on the estimated emotion of the user with respect to the specific environment, and
- control an in-charge moving object in charge of the area to change the surrounding environment of the user.

14. The control system according to claim 1, wherein the moving object is a flying object, a ground moving object, or a moving object in water.

15. The control system according to claim 1, wherein the circuitry is configured to control the moving object to move in a direction of the user to change the surrounding environment of the user.

16. The control system according to claim 1, wherein, when it is estimated that the user has an unpleasant emotion, the circuitry controls the moving object to move in a direction of the user.

17. The control system according to claim 1, wherein the change includes a physical change in the surrounding environment of the user.

18. The control system according to claim 1, wherein the change includes protecting the user from an element of the surrounding environment.

19. A control method comprising:
- estimating an emotion of a user;
- generating a relationship between estimated emotions of a plurality of users and an environment of the user by mapping the estimated emotions of the plurality of users to locations of the plurality of users in the environment of the user; and
- controlling, by circuitry, a moving object to change a surrounding environment of the user depending on the estimated emotion and the generated relationship.

20. A non-transitory storage medium having a program stored therein, the program causing a computer to:
- estimate an emotion of a user;
- generate a relationship between estimated emotions of a plurality of users and an environment of the user by mapping the estimated emotions of the plurality of users to locations of the plurality of users in the environment of the user; and
- control a moving object to change a surrounding environment of the user depending on the estimated emotion and the generated relationship.

* * * * *